(12) United States Patent
Gan

(10) Patent No.: US 12,493,995 B2
(45) Date of Patent: Dec. 9, 2025

(54) SYSTEM AND METHOD FOR ENCODING AND DECODING DATA

(71) Applicant: CANON KABUSHIKI KAISHA, Tokyo (JP)

(72) Inventor: Jonathan Gan, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/691,417

(22) PCT Filed: Jul. 18, 2022

(86) PCT No.: PCT/AU2022/050754
§ 371 (c)(1),
(2) Date: Mar. 12, 2024

(87) PCT Pub. No.: WO2023/039627
PCT Pub. Date: Mar. 23, 2023

(65) Prior Publication Data
US 2024/0394928 A1   Nov. 28, 2024

(30) Foreign Application Priority Data
Sep. 15, 2021   (AU) ................... 2021232739

(51) Int. Cl.
G06T 9/00   (2006.01)
(52) U.S. Cl.
CPC .................... *G06T 9/002* (2013.01)
(58) Field of Classification Search
CPC ......................................... G06T 9/002
USPC ....................................... 375/240.01
See application file for complete search history.

(56) References Cited

U.S. PATENT DOCUMENTS

| 10,713,794 B1 | 7/2020 | He | |
| 2018/0350110 A1 | 12/2018 | Cho | |
| 2019/0102908 A1 | 4/2019 | Yang | |
| 2019/0130274 A1* | 5/2019 | Guo | G06N 7/00 |
| 2021/0215818 A1* | 7/2021 | Kim | G06V 10/764 |
| 2022/0092416 A1* | 3/2022 | Houlsby | G06N 3/08 |

(Continued)

FOREIGN PATENT DOCUMENTS

| JP | 2021087198 A | 6/2021 |
| WO | 2020/174658 A1 | 9/2020 |

(Continued)

OTHER PUBLICATIONS

Joseph Redmon, et al., YOLOv3: An Incremental Improvement, arXiv, vol. 1804.02767v1, Apr. 8, 2018, https://arxiv.org/abs/1804.02767.

(Continued)

*Primary Examiner* — Allen C Wong
(74) *Attorney, Agent, or Firm* — Canon U.S.A., Inc. IP Division

(57) ABSTRACT

A system and method of decoding information for data generated by a first part of a neural network. The method comprises decoding information for determining at least a starting layer of a second part of the neural network, the neural network including at least the first part and the second part, the second part being different from the first part; and determining the starting layer of the second part of the neural network based on the decoded information.

29 Claims, 9 Drawing Sheets

(56) References Cited

U.S. PATENT DOCUMENTS

2024/0029406 A1* 1/2024 Zhao .................... G06V 10/776

FOREIGN PATENT DOCUMENTS

| WO | 2020230188 A1 | 11/2020 |
| WO | 2021/059476 A1 | 4/2021 |

OTHER PUBLICATIONS

Alexey Bochkovskiy, et al., YOLOv4: Optimal Speed and Accuracy of Object Detection, arXiv, vol. 2004.10934v1, Apr. 23, 2020, https://arxiv.org/abs/2004.10934.

Chris Rosewarne et al., [VCM] Coding results of feature map compression for object tracking, International Organisation for Standardisation, ISO/IEC JTC 1/SC 29/WG 2, Doc. No. m56666, Apr. 2021.

Yiping Kang et al., Neurosurgeon: Collaborative Intelligence Between the Cloud and Mobile Edge, ASPLOS '17: Proceedings of the Twenty-Second International Conference on Architectural Support for Programming Languages and Operating Systems, 2017.

* cited by examiner

SYSTEM AND METHOD FOR ENCODING AND DECODING DATA

REFERENCE TO RELATED APPLICATION(S)

This application is the National Phase application of PCT Application No. PCT/AU2022/050754, filed on Jul. 18, 2022. This application claims the benefit under 35 U.S.C. § 119 of the filing date of Australian Patent Application No. 2021232739, filed Sep. 15, 2021, hereby incorporated by reference in its entirety as if fully set forth herein.

TECHNICAL FIELD

The present invention relates generally to digital video signal processing and, in particular, to a method, apparatus and system for encoding and decoding tensors from a convolutional neural network. The present invention also relates to a computer program product including a computer readable medium having recorded thereon a computer program for encoding and decoding tensors from a convolutional neural network using feature compression technology.

BACKGROUND

Video compression is a ubiquitous technology used to support many applications, including applications for transmission and storage of video data. Key to the ubiquity of video compression technology is the adoption of video coding standards, which permit interoperability between applications and devices produced by many commercial entities. Video coding standards themselves are developed by Standards Settings Organisations (SSOs), such as Study Group 16, Question 6 (SG16/Q6) of the Telecommunication Standardisation Sector (ITU-T) of the International Telecommunication Union (ITU), also known as the "Video Coding Experts Group" (VCEG); and the International Organisation for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

Convolutional neural networks (CNNs) are an emerging technology addressing, among other things, use cases involving machine vision such as object recognition, object tracking, human pose estimation, action recognition, and many more. With growing usage of machine vision in automated processes, MPEG has formed an exploratory ad-hoc group investigating technology that could support a video compression standard where the consumer of the video is a machine rather than a human.

CNNs typically include many layers, such as convolution layers and fully connected layers, with data passing from one layer to the next in the form of 'tensors'. Parameters of layers in a CNN are generally referred to as 'weights', such that the output tensor of a layer is calculated from the input tensor to the layer and the weights of the layer. Weights for the layers are determined by training the CNN. Typically, the CNN is trained with at least some data that is labelled. Training with labelled data is also known as supervised learning, while the labels may also be called 'ground truth'. Before training, the initial value of the weights may be chosen randomly, or copied from a pre-trained network whose weights were optimised for a related task. To achieve good performance, CNNs are trained on very large amounts of training data. Training on very large amounts of data is made tractable by iterating over the training data in batches. At each iteration, an error function computed from the output and the ground truth is used to optimise the weights in a process called backpropagation. The exact optimisation method may be stochastic gradient descent, or another variant such as momentum. When training is completed the weights are fixed. Executing a trained CNN on an input to produce an output is commonly referred to as 'inferencing' or 'inference'.

Generally, a tensor has four dimensions, namely: batch size, channels, height, and width. The data represented within a tensor may be referred to as 'features'. When inferencing on video data, the batch size is one if the video is processed frame by frame. The number of channels generally corresponds to the number of features that can be represented by the CNN at that layer. At earlier layers of the CNN, features tend to capture low-level visual properties such as edges and textures, while at later layers of the CNN, features tend to capture higher level semantics such as object classes. The tensor may also be referred to as a set of 'feature maps', where the number of feature maps is equal to the channels dimension and the tensor height and width are the spatial resolution of each feature map.

Where a convolution layer has a 'stride' greater than one, the output tensor from the convolution has a lower spatial resolution than the input tensor. Operations such as 'max pooling' also reduce the spatial size of the output tensor compared to the input tensor. Max pooling produces an output tensor by dividing the input tensor into groups, such as 2×2, and from each group selecting the maximum value as output for the corresponding value in the output tensor. As data is progressed through a CNN, tensors typically reduce in spatial resolution, but may increase in the channels dimension.

In one potential pipeline for compression of video for machines, intermediate CNN features may be compressed rather than the original video data, which may be referred to as 'feature coding'. The feasibility of feature coding, in particular competitiveness of feature coding relative to video coding, depends on two main factors: the size of the features relative to the size of the original video data; and the ability of the feature coder to find and exploit redundancies in the features.

SUMMARY

It is an object of the present invention to substantially overcome, or at least ameliorate, one or more disadvantages of existing arrangements.

One aspect of the present disclosure provides a method of decoding information for data generated by a first part of a neural network, the method comprising: decoding information for determining at least a starting layer of a second part of the neural network, the neural network including at least the first part and the second part, the second part being different from the first part; and determining the starting layer of the second part of the neural network based on the decoded information.

According to another aspect, the method further comprises decoding the data generated by the first part from a bitstream; and processing the decoded data using the second part of the neural network in accordance with the determined starting layer.

According to another aspect, the method further comprises: transmitting the decoded information indicating the starting layer to an external processing device, decoding the data generated by the first part of the neural network from a bitstream at the external processing device; and processing the decoded data using the second part of the neural network in accordance with the determined starting layer.

According to another aspect, the neural network includes a layer of a first type which is a summation layer, and the starting layer of the second part of the neural network is limited to a layer which is not the first type.

According to another aspect, the neural network includes a layer of a second type which is a convolutional layer, and the starting layer of the second part of the neural network is limited to a layer which is immediately after a layer of the second type.

According to another aspect, the neural network includes a layer of a third type which is an output layer, and the starting layer of the second part of the neural network is limited to a layer which is included in a set of layers from a predetermined layer to a layer of the third layer in order of processing of the neural network, and the set of layers does not include a layer of the first type.

According to another aspect, the information indicates a difference between a predetermined layer and the starting layer.

According to another aspect, the neural network includes a layer of a second type which is a convolutional layer, and the predetermined layer is a layer which is immediately after a layer of the second type in the order of processing.

According to another aspect, the neural network includes a layer of a third type which is an output layer, and the predetermined layer is a layer of the third layer.

According to another aspect, the predetermined layer is determined based on information indicating the neural network to be used.

According to another aspect, the information identifies the neural network to be used, and the starting layer of the second part of the neural network is determined from information which associates the starting layer with the neural network.

According to another aspect, the information identifies (i) the neural network from a plurality of neural networks and (ii) a split point for the first and second parts of the neural network, and the starting layer of the second part of the neural network is determined from the split point.

According to another aspect, a plurality of starting layers of the second part of the neural network are determined in accordance with the information, and the data is processed using the second part of the neural network in accordance with the determination of the plurality of starting layers.

Another aspect of the present disclosure provides a method of encoding information for data processed using a first part of a neural network, the method comprising: determining a starting layer of a second part of the neural network, the neural network including at least the first part and the second part, the second part being different from the first part; encoding information used for determining at least the starting layer of the second part of the neural network.

According to another aspect, the method further comprises: generating the data in accordance with the determination of the starting layer; and encoding the data processed using the first part.

According to another aspect, the neural network includes a layer of a first type which is a summation layer, and the starting layer of the second part is limited to a layer which is not the first type.

According to another aspect, the neural network includes a layer of a second type which is a convolutional layer, and the starting layer of the second part is limited to a layer which is immediately after a layer of the second type.

According to another aspect, the neural network includes a layer of a third type which is an output layer, and the starting layer of the second part is limited to a layer which is included in a set of layers from a predetermined layer to a layer of the third layer in order of processing of the neural network, and the set of layers does not include a layer of the first type.

According to another aspect, the encoded information indicates a difference between a predetermined layer and the starting layer.

According to another aspect, the neural network includes a layer of a second type which is a convolutional layer, and the predetermined layer is a layer which is immediately after a layer of the second type in the order of processing.

According to another aspect, the neural network includes a layer of a third type which is an output layer, and the predetermined layer is a layer of the third layer.

According to another aspect, the predetermined layer is determined based on information indicating the neural network to be used.

According to another aspect, the encoded information identifies the neural network to be used, and the starting layer of the second part of the neural network is determined from information which associates the starting layer with the neural network.

According to another aspect, the processing using the first part of the neural network is ended at a layer which is immediately before the starting layers.

According to another aspect, a plurality of starting layers of the second part are determined, and the data is processed using the second part of the neural network in accordance with the determination of the plurality of starting layers.

According to another aspect, the second part is to be used for processing data decoded from the bitstream.

According to another aspect, the encoded information identifies (i) the neural network from a plurality of neural networks and (ii) a split point for the first and second parts of the neural network.

Another aspect of the present disclosure provides a decoder for decoding information for data generated by a first part of a neural network, the decoder comprising: a decoding unit configured to decode information for determining at least a starting layer of a second part of the neural network, the neural network including at least the first part and the second part, the second part being different from the first part; and a determining unit configured to determine the starting layer of the second part of the neural network based on the decoded information.

Another aspect of the present disclosure provides an encoder for encoding information for data processed using a first part of a neural network, the encoder comprising: a determining unit configured to determine a starting layer of a second part of the neural network, the neural network including at least the first part and the second part, the first part being different from the second part; an encoding unit configured to encode information used for determining at least the starting layer of the second part of the neural network.

Another aspect of the present disclosure provides a non-transitory computer-readable storage medium which stores a program for executing a method of decoding information for data generated by a first part of a neural network, the method comprising: decoding information for determining at least a starting layer of a second part of the neural network, the neural network including at least the first part and the second part, the second part being different from the first part; and determining the starting layer of the second part of the neural network based on the decoded information.

Another aspect of the present disclosure provides a non-transitory computer-readable storage medium which stores a program for executing a method of encoding information for data processed using a first part of a neural network, the method comprising: determining a starting layer of a second part of the neural network, the neural network including at least the first part and the second part, the first part being different from the second part; encoding information used for determining at least the starting layer of the second part of the neural network.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Figure 1:
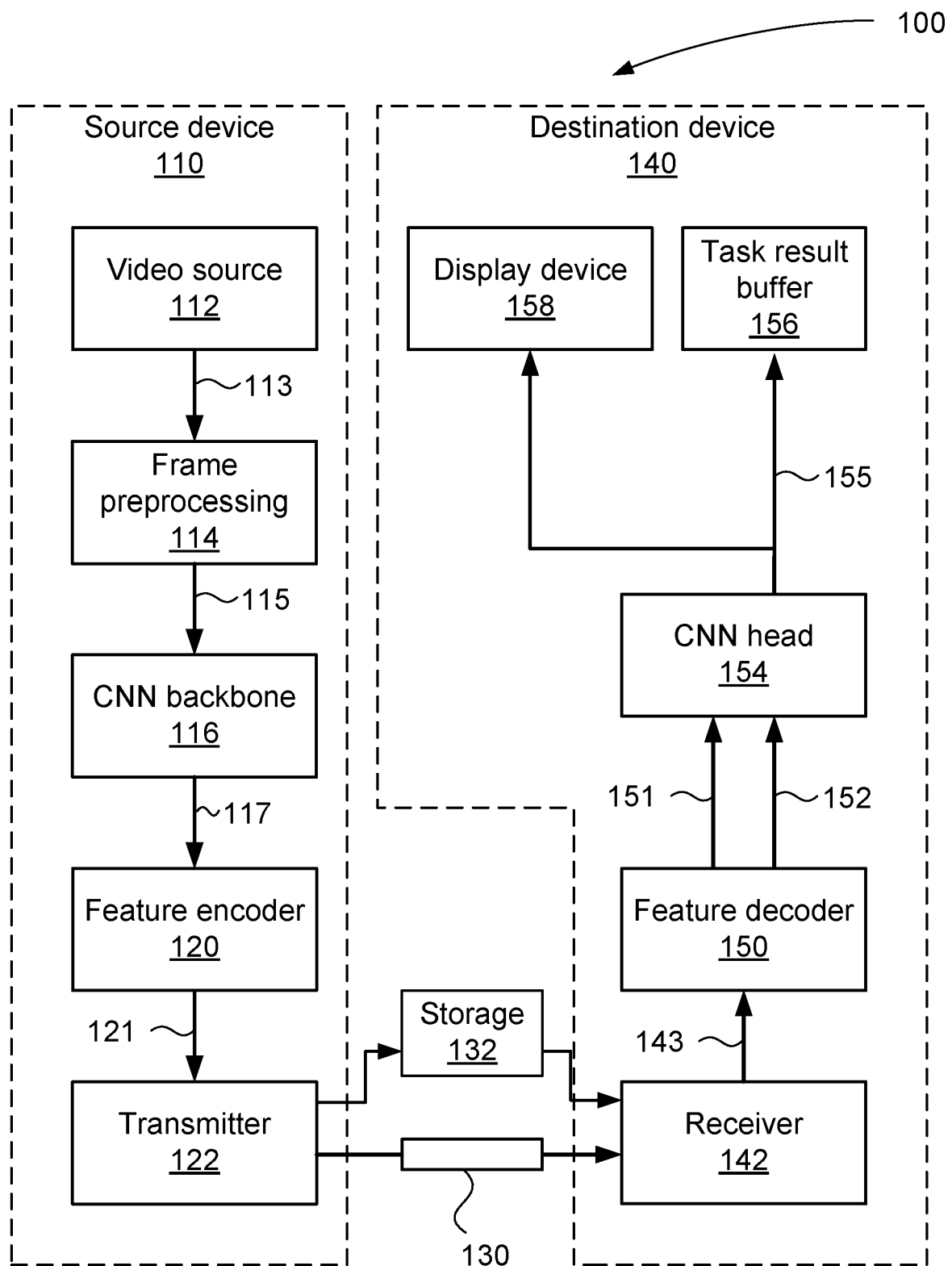
FIG. 1 is a schematic block diagram showing a distributed machine task system.

Where reference is made in any one or more of the accompanying drawings to steps and/or features, which have the same reference numerals, those steps and/or features have for the purposes of this description the same function(s) or operation(s), unless the contrary intention appears.

As described above, one potential pipeline for compression of video for machines is feature coding. FIG. 1 is a schematic block diagram showing functional modules of a distributed feature coding system 100. The system 100 includes a source device 110 and a destination device 140. A communication channel 130 is used to communicated encoded feature information from the source device 110 to the destination device 140. The source device 110 may include an edge device, such as a network camera, a smartphone, or a system of devices incorporating the functional modules included in source device 110. The communication channel 130 may be a wired connection, such as Ethernet, or a wireless connection, such as WiFi or 5G. The destination device 140 may be a server farm based ('cloud') application, or a centralised device such as an automative monitoring system. Moreover, the edge device functionality may be embodied in a cloud server, and intermediate compressed data may be stored for later processing, potentially for multiple different tasks depending on need.

As shown in FIG. 1, the source device 110 includes a video source 112, a frame preprocessing module 114, a CNN backbone 116, a feature encoder 120, and a transmitter 122.

The video source 112 typically comprises a source of captured video frame data (shown as 113), such as an image capture sensor, a previously captured video sequence stored on a non-transitory recording medium, or a video feed from a remote image capture sensor.

The frame preprocessing module 114 receives the video frame data 113 and may perform image preprocessing steps, such as image registration, white colour balancing, and image resizing, outputting preprocessed frame data 115. Image preprocessing may be performed to improve the performance of the CNN backbone 116. For example, image resizing may be beneficial as a preprocessing step to control the computational requirements of the CNN backbone 116 and the feature encoder 120. The CNN backbone 116 may also be trained to perform a computer vision task, also referred to as a machine vision task, over an optimal range of image scales, and image resizing may be performed to generate preprocessed frame data 115 with spatial dimensions within the optimal range of image scales.

The CNN backbone 116 receives the preprocessed frame data 115 and provides the frame data 115 for propagation through initial layers of an overall CNN architecture. The initial layers of the overall CNN architecture may also be referred to as the 'backbone' or the 'backbone network' of the CNN and output a set of features. As described above, features produced by the initial layers of the CNN tend to capture low-level visual properties such as edges and textures. Low-level visual properties are fundamental to computer vision and not specialised to any particular machine task. The overall CNN architecture may support multiple different CNNs, each performing a different computer vision task, but each sharing the same CNN backbone 116. For example, in one arrangement the overall CNN architecture may be a Detectron2 architecture. In the arrangement using Detectron2 architecture, the CNN backbone 116 may be a ResNet backbone, or a ResNeXt backbone. In another arrangement the overall CNN architecture may be a YOLO architecture. For a YOLO architecture the CNN backbone 116 may be a Darknet53 backbone, or a CSP-Darknet53 backbone.

The feature coding system 100 corresponds to a specific CNN selected for performing a desired computer vision task. The selected CNN is split into the initial layers, referred to as the backbone network, and the remaining layers, referred to as the 'head', or the 'head network'. While the CNN backbone 116 generalises across multiple computer vision tasks, the head network is specialised to the desired computer vision task of feature coding system 100. In one arrangement, the split between the backbone network and the head network occurs at a single point in the CNN. The starting layer of the head network is determined from the split point. If the split occurs at a single point, the CNN backbone 116 outputs backbone features 117 which correspond to a single tensor output from the last layer of the backbone network. In another arrangement, the split between the backbone network and the head network occurs at multiple points in the CNN. The multiple split points typically correspond to different spatial scales along the backbone 116. The backbone features 117 represent video data processed at least by a first part of a CNN, the backbone network.

If using multiple split points, the backbone features 117 consist of multiple tensors corresponding to the output of the backbone network 116 at each of the split points. In a multiple split configuration, the split points typically occur at different spatial scales of the backbone network, and the backbone features 117 may be referred to as a 'feature pyramid network' (FPN). While FPN features are generally larger in size than single-layer features, FPN features are able to capture information across a wider range of spatial scale. Computer vision tasks performed on FPN features are typically able to achieve higher performance. For example, object detection based on FPN features is generally able to achieve better accuracy and precision.

The feature encoder 120 receives and encodes the backbone features 117, thereby encoding tensors generated by the CNN backbone module 116. In the example of FIG. 1 the feature encoder 120 encodes the backbone features 117 to a bitstream 121. In other implementations the feature encoder may store the encode the backbone features 117 in a different format or structure, for example in a packed frame arrangement or another structured storage arrangement. In one arrangement, the feature encoder 120 may reuse a conventional hybrid video encoder. For example, the feature encoder 120 may use a hybrid video encoder such as an encoder compatible with the High Efficiency Video Coding (HEVC) standard, or the Versatile Video Coding (VVC) standard, or the AV1 standard. In an arrangement using a conventional hybrid video encoder, the backbone features 117 are first processed into a format suitable for hybrid video coding. The backbone features 117 may be quantised from floating point to integer representation. The tensors corresponding to the backbone features 117 are packed into frames for video coding. For example, the tensors corresponding to FPN features for a single video frame 113 have dimensionality determined by the number of channels and spatial size, with varying dimensionality across the FPN scales. The packing algorithm may rearrange the tensor samples into a monochrome frame, a YCbCr frame, or a set of temporally consecutive frames.

In another arrangement, the feature encoder 120 may directly use the backbone features 117 without any quantisation or frame packing. In such an arrangement the feature encoder 120 may be implemented with a neural network encoder. In yet another arrangement, the feature encoder 120 may quantise the backbone features 117 to integer representation, but not perform any frame packing. In an arrangement with quantisation but without frame packing, the feature encoder 120 may use an integerised neural network encoder, or a designed algorithm for feature coding, or a combination of both.

In addition to the backbone features 117, the feature encoder 120 also encodes metadata to the bitstream 121. The metadata identifies the CNN backbone 116 that is used to produce the backbone features 117. The backbone is uniquely identified by indicating both the overall CNN architecture, and the specific split point or split points separating the backbone network from the head network. The overall CNN architecture may be signalled in the metadata by a syntax element cnn_architecture, with semantics as shown in Table 1 below. The CNN architectures listed in Table 1 are exemplary only and not exhaustive. The split point or split points may be signalled in the metadata by a syntax element network_split_points. The signalling mechanism and semantics for network_split_points are described below in arrangements with reference to FIGS. 3, 4, 5 and 6 and Table 5.

TABLE 1

CNN architecture signalling and semantics

| cnn_architecture | CNN architecture |
|---|---|
| 0 | ResNeXt 101 layer |
| 1 | ResNeXt 50 layer |

TABLE 1-continued

CNN architecture signalling and semantics

| cnn_architecture | CNN architecture |
|---|---|
| 2 | ResNet 101 layer |
| 3 | ResNet 50 layer |
| 4 | YOLOv3 |
| 5 | YOLOv4 |
| 6– | (Reserved for future use) |

The bitstream 121 is transmitted by the transmitter 122 over the communication channel 130 as encoded feature data. The bitstream 121 can in some implementations be stored in a non-transitory storage device 132, such as a "Flash" memory or a hard disk drive, until later being transmitted over the communication channel 130, or in-lieu of transmission over the communication channel 130. For example, encoded feature data may be accessed upon demand from storage for a video surveillance application.

The destination device 140 includes a receiver 142, a feature decoder 150, a CNN head 154, a task result buffer 156, and optionally a display device 158. The receiver 142 receives encoded feature data from the communication channel 130 and passes received feature data to the feature decoder 150 as a bitstream (indicated by an arrow 143). The feature decoder 150 decodes backbone features 151 as well as metadata 152 from the bitstream 143. In implementations where the feature encoder encoded feature data to a structure other than a bitstream, the decoder 150 decodes backbone features 151 and metadata 152 based on the different structure. Similarly to the feature encoder 120, in one arrangement the feature decoder 150 may use a hybrid video decoder such as a decoder compatible with the High Efficiency Video Coding (HEVC) standard, or the Versatile Video Coding (VVC) standard, or the AV1 standard. In an arrangement using a conventional hybrid video decoder, the decoded video frames are unpacked and dequantised back to floating point format tensors suitable for insertion to a head network. In another arrangement, the feature decoder 150 may directly decode the backbone features 151 as floating point tensors. In a direct decoding arrangement the feature decoder 150 may be implemented with a neural network decoder. In yet another arrangement, the feature decoder 150 may decode integer precision tensors using an integerised neural network decoder, or a designed algorithm for feature decoding, or a combination of both. In such an arrangement, the integer precision tensors may be dequantised to floating point tensors, or passed directly as integer precision tensors to the CNN head 154.

The decoded metadata 152 identifies the CNN backbone 116 that was used to produce the decoded backbone features 151. The decoded metadata 152 may uniquely identify the CNN backbone 116 by the syntax element cnn_architecture indicating the overall CNN architecture, and the syntax element network_split_points identifying a specific split point or split points separating the backbone network from the head network. The decoded metadata 152 may be obtained from a 'supplementary enhancement information' (SEI) message present in the bitstream 143. In one arrangement the decoded metadata 152 may be present and decoded from the bitstream on every frame. In another arrangement, the decoded metadata 152 may be present and decoded less frequently than on every frame. For example, the decoded metadata 155 may be decoded from a header of the bitstream 143, such as a sequence parameter set (SPS) or a video parameter set (VPS). When the decoded metadata 152 is absent for a given frame, the most recently available metadata is used.

As described above, the CNN backbone 116 in source device 110 generalises across multiple computer vision tasks, but the head network is specialised to the desired computer vision task of feature coding system 100. For example, the desired computer vision task may be any one of (but not restricted to) image classification, object detection, object segmentation, object tracking, pose estimation, video reconstruction, or action recognition. The CNN head module 154 first identifies the CNN backbone 116 that was used from the decoded metadata 152. A head network is selected that is both compatible with the CNN backbone 116 and is specialised for the desired computer vision task. The selected head network receives the decoded backbone features 151 and performs the remaining 'head network' layers of the overall CNN architecture. In some arrangements the output of the selected head network is a task result 155. In other arrangements, the output of the selected head network may be processed further by the CNN head module 154 to produce the task result 155. The CNN head module 154 performs a computer vision task in producing the task result 155. For example, for an object detection task the selected head network may output object detection proposals. The object detection proposals are filtered down to object detection results by discarding object detection proposals with low confidence score, and discarding object detection proposals with significantly overlapping area. The task result 155 is stored in the task result buffer 156. The task result 155 stored in the task buffer can be used by the destination device 140 to complete actions associated with the machine vision task result. For example, a detected object can be output to a security application, displayed or an alert issued or a path of a tracked object can be used for security purposes.

The task result 155 may also be displayed on the optional display device 158. For example, for object detection or object tracking tasks, bounding boxes related to detected objects may be plotted on the display device 158. In another example, if the computer vision task is reconstruction of the original video frame data 113, the task result 155 is reconstructed video data which can be displayed on the display device 158. Examples of the display device 158 include a cathode ray tube, a liquid crystal display, a light emitting diode (LED) display, an organic LED (OLED) display, or a quantum dot LED (QLED) display.

In the above arrangement, both metadata identifying the CNN backbone 116 and backbone features 117 are encoded to the same bitstream 121. In the destination device 140, both backbone features 151 and metadata 152 are decoded from the same bitstream 143. In another arrangement, separate bitstreams may be used to transmit the backbone features and the metadata. For example, the metadata identifying the CNN backbone 116 is encoded to the bitstream 121, while the backbone features 117 are encoded to a separate feature bitstream. In the destination device 140, the metadata 152 is decoded from the bitstream 143, while the backbone features 151 are decoded from the separate feature bitstream. One advantage of transmitting the metadata and backbone features in separate bitstreams is that the metadata can be transmitted in a separate 'out of band' channel. Metadata transmitted in a separate channel can be transmitted in a channel with greater error resilience and lower bandwidth requirements, and can be decoded independently from handling of the separate feature bitstream.

Figure 2A:
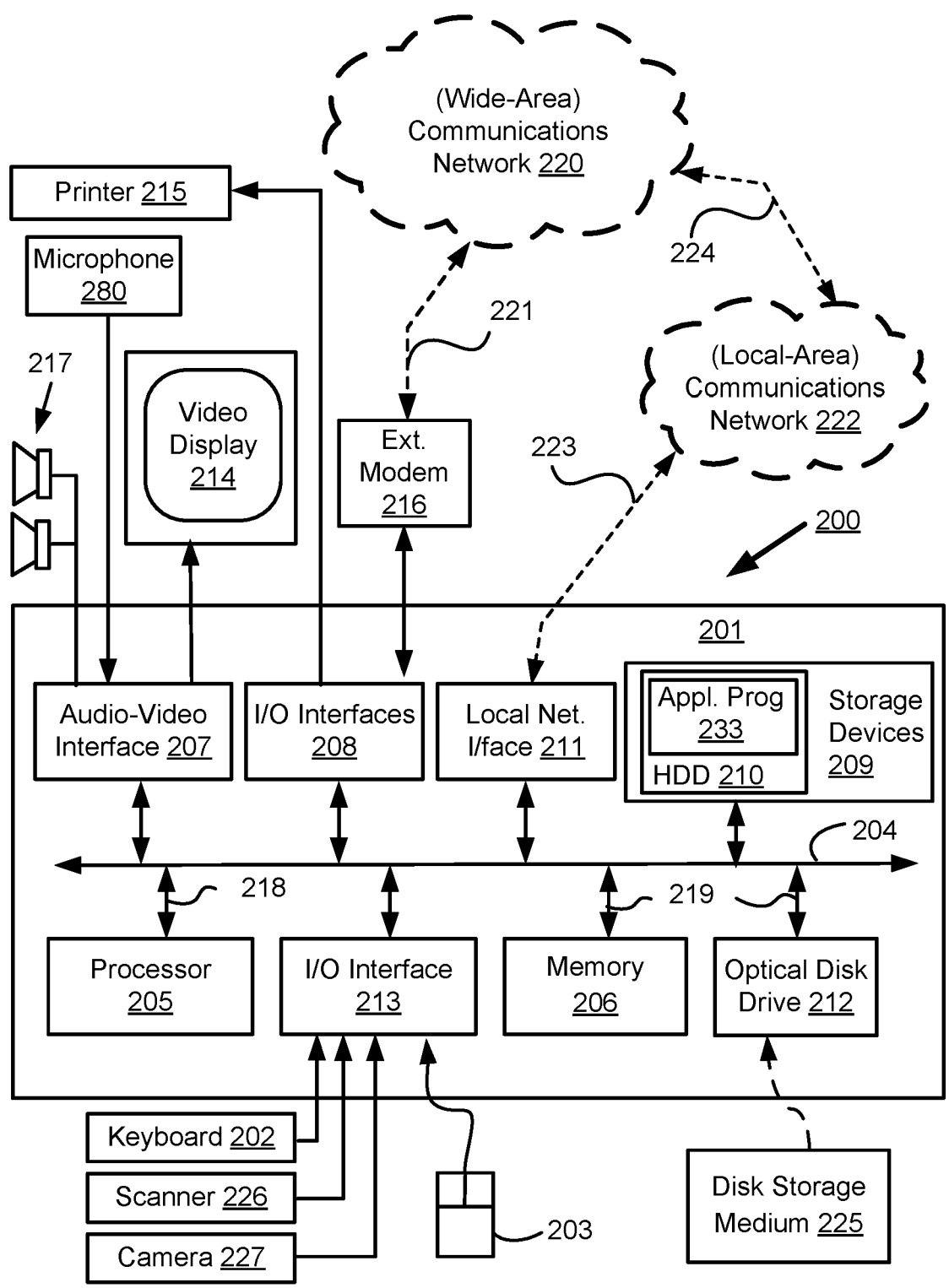
FIGS. 2A and 2B form a schematic block diagram of a general purpose computer system upon which the distributed machine task system of FIG. 1 may be practiced.

Notwithstanding the example devices mentioned above, each of the source device 110 and destination device 140 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 158, and loudspeakers 217. An external Modulator-Demodulator (Modem) transceiver device 216 may be used by the computer module 201 for communicating to and from a communications network 220 via a connection 221. The communications network 220, which may represent the communication channel 130, may be a (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 142 and the communication channel 130 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 122 and the receiver 142 and communication channel 130 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 140 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the feature encoder 120 and the feature decoder 150, as well as methods described below, may be implemented using the computer system 200. In particular, the feature encoder 120, the feature decoder 150 and methods to be described, may be implemented as one or more software application programs 233 executable within the computer system 200. In particular, the feature encoder 120, the feature decoder 150 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the source device 110 and the destination device 140 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
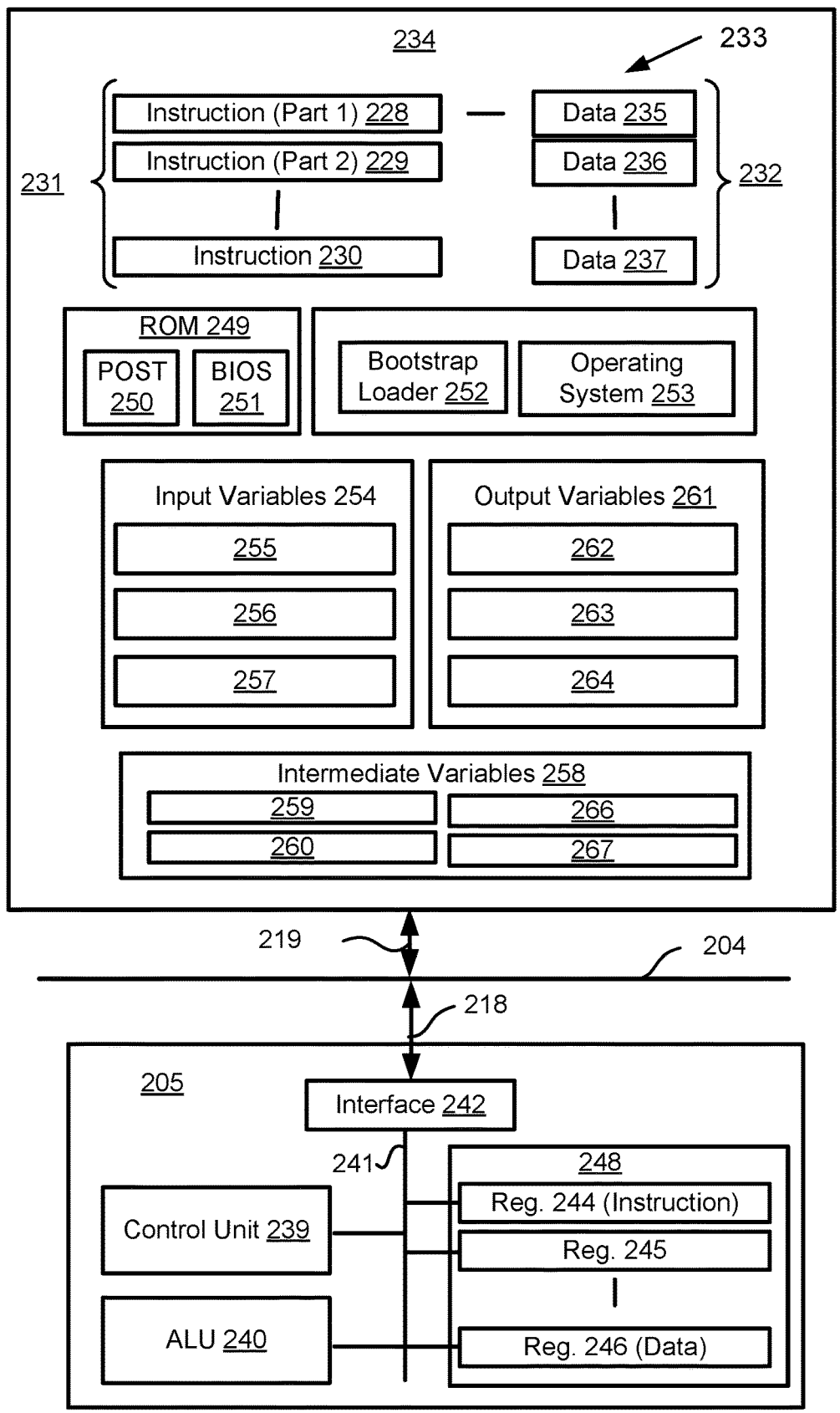

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The feature encoder 120, the feature decoder 150 and the described methods may use input variables 254, which are stored in the memory 234 in corresponding memory locations 255, 256, 257. The feature encoder 120, the feature decoder 150 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 7:
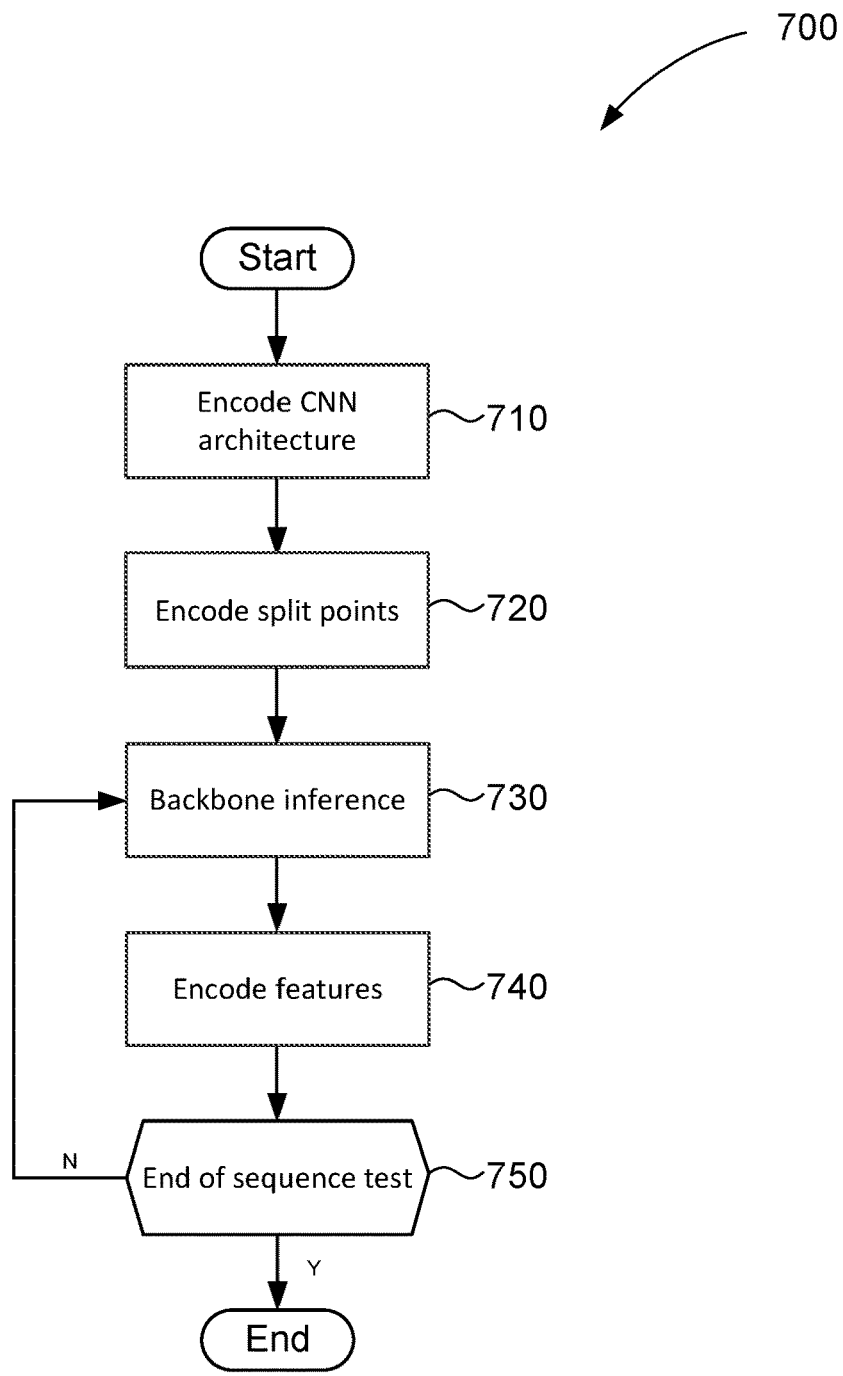
FIG. 7 shows a method for encoding neural network features and associated metadata to a bitstream.
Figure 8:
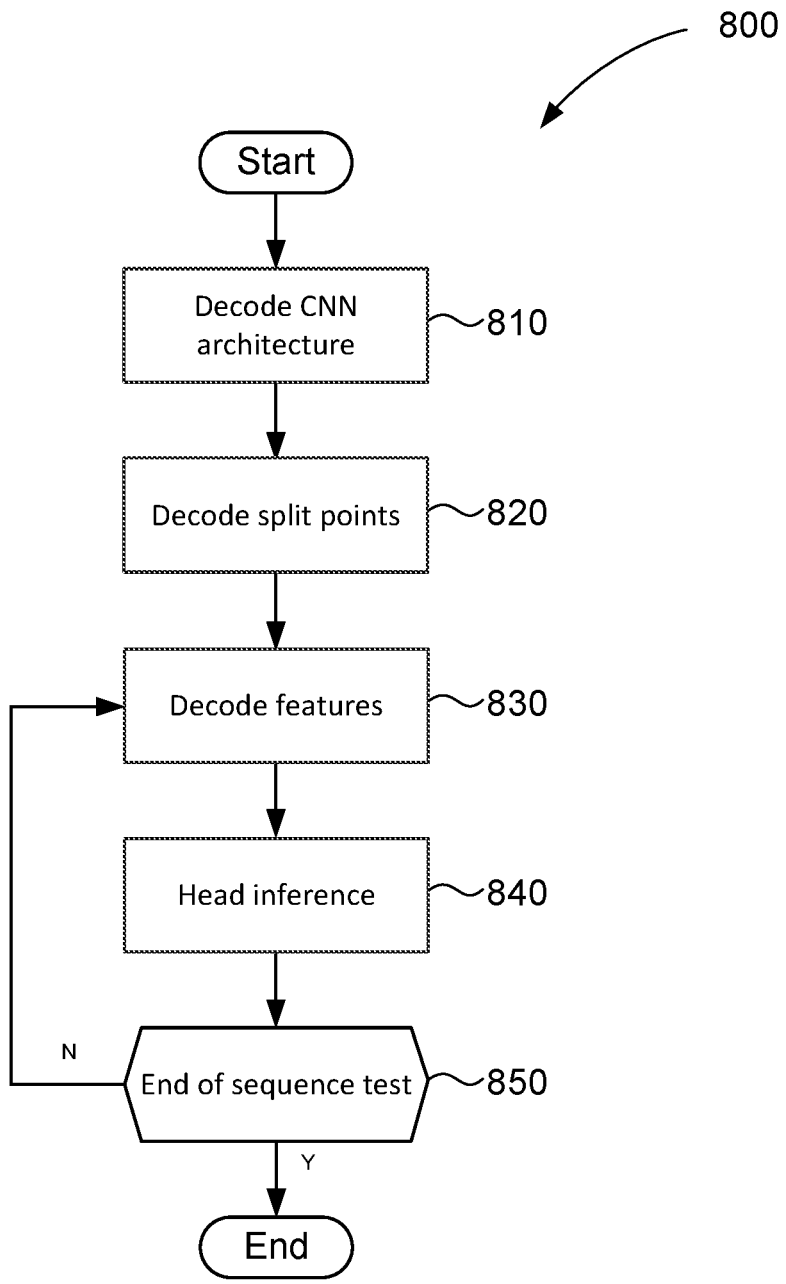
FIG. 8 shows a method for decoding neural network features from a bitstream and performing desired computer vision tasks.

Each step or sub-process in the methods of FIGS. 7 and 8, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3:
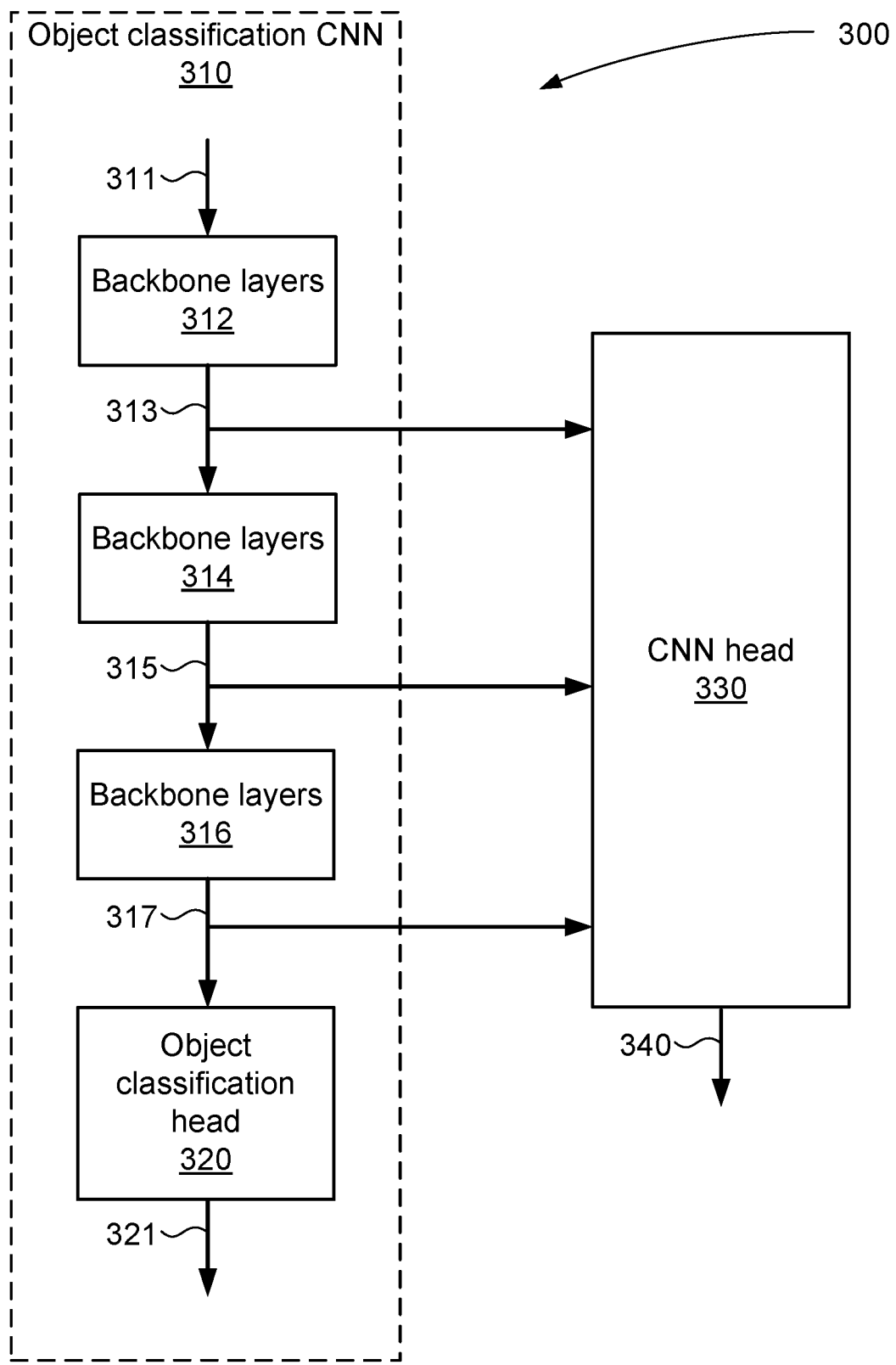
FIG. 3 is a schematic block diagram showing an example CNN architecture for which there is a canonical image classification CNN.

The feature coding system 100 performs the desired computer vision task using a specific CNN selected for the desired computer vision task. The selected CNN is split into a first part being the backbone network, which is performed by the CNN backbone 116. The selected CNN is also split into a different second part being the head network, which is performed by the CNN head 154. As described hereafter, while the CNN is split into at least the backbone network and the head network, the split points (and thereby the backbone and the head networks implemented) can vary. FIG. 3 is a schematic block diagram showing an architecture 300 of a general policy by which split points between the backbone network and the head network may be defined.

In the policy of FIG. 3, the selected CNN belongs to an overall CNN architecture for which there is a canonical image classification CNN 310. Image classification is a fundamental computer vision task upon which more complex computer vision tasks are typically built. For example, the ResNet and ResNeXt CNN architectures are described firstly in terms of an arrangement of neural network layers that are trained to achieve the image classification task. Similarly, the YOLOv3 CNN architecture includes a backbone network called Darknet53 which is pretrained for image classification, and the YOLOv4 CNN architecture includes a backbone network called CSP-Darknet53 which is pretrained for image classification.

Video data 311 is input to the image classification CNN 310. In the example of FIG. 3, the video data 311 is processed by an example sequence of backbone layers modules 312, 314, and 316, producing backbone feature tensors 313, 315, and 317 respectively. The number of backbone layers modules and the number of corresponding backbone feature tensors is three only as an example. Generally, in other implementation, any number of backbone feature tensors can be extracted from the backbone network of image classification CNN 310 as appropriate. The final backbone feature tensor 317 is input to an image classification head 320, which produces a classification task result 321.

In the policy of FIG. 3, the backbone feature tensors 313, 315 and 317 can alternatively be input to a CNN head 330 which performs a computer vision task other than image classification, producing a task result 340. Referring to the examples of ResNet and ResNeXt CNN architectures above, for the same backbone used by image classification these architectures define head networks which can perform object detection and object segmentation. The YOLOv3 and YOLOv4 CNN architectures define head networks which perform object detection from the output of their respective backbone networks.

In one arrangement of the feature coding system 100, the selected CNN is split into the backbone network and the head network by the policy of FIG. 3. The policy of FIG. 3 can be summarised as follows. The backbone network is composed of the greatest set of backbone layer modules 312, 314 and 316, which are wholly contained within the canonical image classification CNN 310 for the overall CNN architecture, and which may also be used to perform at least one computer vision task other than image classification. The head network 330 takes as input the backbone feature tensors 313, 315 and 317. Therefore, the split points between the backbone network and the head network are intermediate points wholly contained within the canonical image classification CNN 310. The tensor data received at the CNN head 330 has been processed by at least one part of the canonical image classification CNN 310, one or more of CNN backbone layers 312, 14 and 316. The split points are indicated by signalling the syntax element network_split_points with a semantic meaning of default split points being used. In the destination device 140, the CNN head 154 determines the overall CNN architecture from the cnn_architecture syntax element in the decoded metadata 152, and predetermined split points for the determined CNN architecture are used if the network_split_points syntax element is determined to be default.

Figure 4:
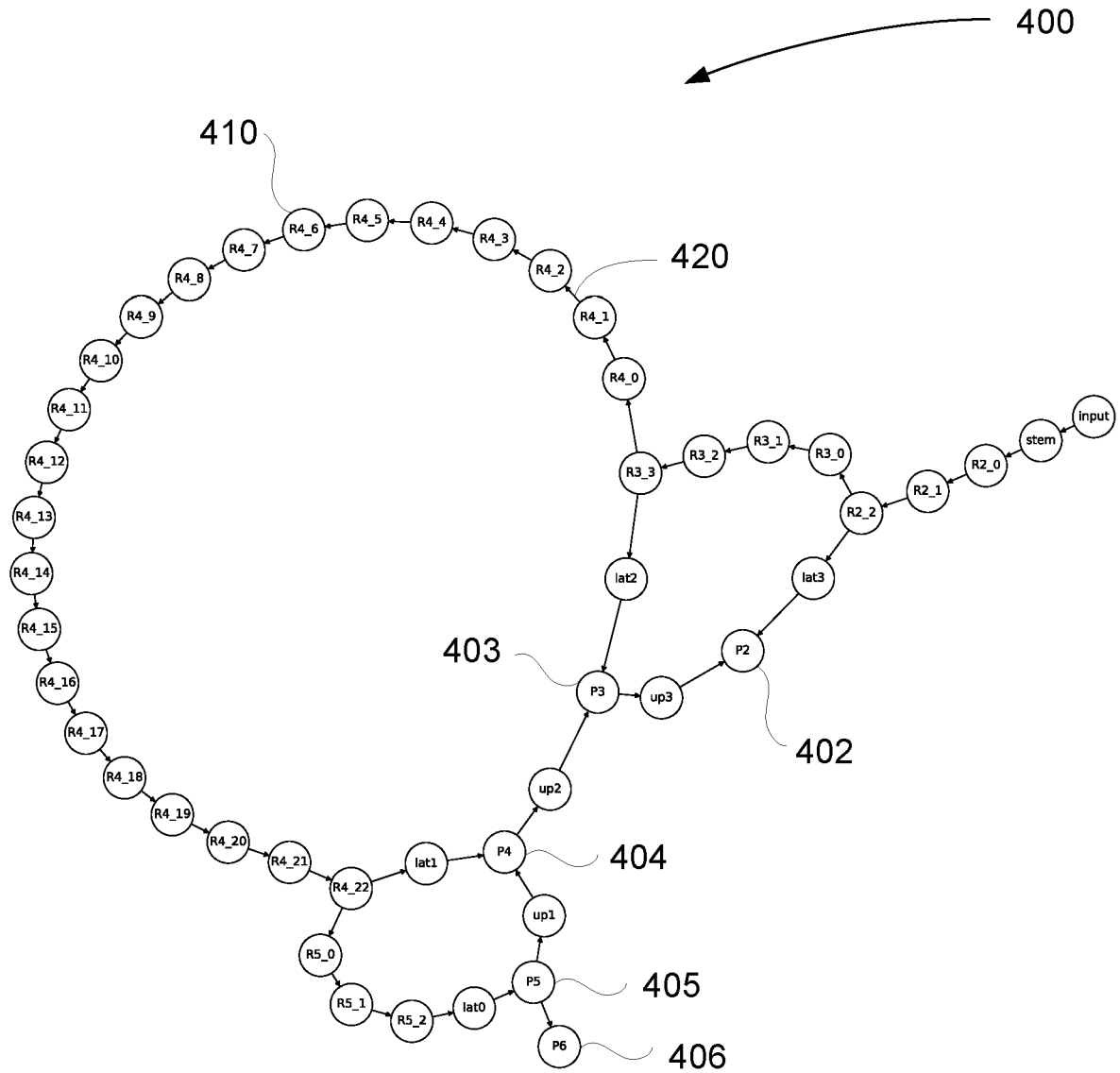
FIG. 4 is a schematic graph showing a backbone network for a ResNeXt 101 layer network.

FIG. 4 shows a graph representation of an example backbone network 400 for the ResNeXt 101 layer architecture. The backbone network 400 satisfies the policy described in relation to FIG. 3. That is, the backbone network 400 is wholly contained within the canonical ResNeXt 101 layer image classification network. Each node, such as a node 410 in the example backbone network 400, represents a neural network layer or a group of neural network layers. Each arrow, such as the arrow 420 in the example backbone network 400, represents a backbone feature tensor passing from one neural network layer to another neural network layer. In the example backbone network 400, outputs of nodes P2, P3, P4, P5 and P6 (402-406 respectively) are the predetermined split points for the ResNeXt 101 layer architecture. The backbone defined by split points at the output of nodes P2, P3, P4, P5 and P6 is signalled by setting cnn_architecture to zero (having a semantic meaning of ResNeXt 101 layer architecture from Table 1) and setting network_split_points to a default value of zero. Different computer vision tasks may be accomplished by using different head networks compatible with the backbone network 400. For example, object detection may be performed by using a 'Faster R-CNN' head network, while object segmentation may be performed by using a 'Mask R-CNN' head network.

An alternative split point is the output of node 'stem' in the backbone network 400. In an implementation using a split point after the node stem, the backbone network is signalled by setting cnn_architecture to zero, and setting network_split_points to one. The range of values that network_split_points can take and the corresponding semantic meanings are dependent on the overall CNN architecture determined first by decoding cnn_architecture. An example mapping of values to semantics for network_split_points for the example backbone network 400 of FIG. 4 is shown in Table 2 below. In the example of Table 2, a fixed number of values for the network_split_points syntax element map to a fixed number of predetermined split points.

TABLE 2

Split points signalling and semantics

| cnn_architecture | network_split_points | Split points |
|---|---|---|
| 0 | 0 | Output of P2, P3, P4, P5 and P6 layers |
| 0 | 1 | Output of stem layer |
| 0 | 2– | (Reserved for future use) |

For a particular computer vision task, the feature coding system 100 may flexibly use any one of a number of CNN architectures according to trade-offs between task performance, complexity, and bitrate. Task performance can be estimated offline with test data that has ground truth. Task performance metrics depend on the particular computer vision task. For example, object detection and segmentation performance may be measured by mean average precision (mAP), object tracking performance may be measured by multiple object tracking accuracy (MOTA), and video reconstruction performance may be measured by peak signal to noise ratio (PSNR). High task performance may be important for use cases which are sensitive to machine task error, such as fully autonomous self-driving vehicles. Complexity of the feature coding system 100 is affected by the CNN architecture since a smaller CNN has less multiply-accumulate-add operations. A lower complexity CNN architecture is advantageous for reducing the cost of products implementing the feature coding system 100. The compression efficiency of the feature coding system 100 depends on two main factors: the size of the backbone features 117, and the efficiency of the feature encoder 120 in exploiting redundancies in the backbone features 117. The choice of CNN architecture affects the size of the backbone features 117, and therefore the bitrate of the bitstream 121.

Additionally, for the desired computer vision task and the particular CNN architecture used by the feature coding system 100, the CNN head 154 may flexibly select any one of a number of head networks according to trade-offs between task performance and complexity. The selected head network must be compatible with the decoded backbone features 151 and perform the desired computer vision task, but within these constraints multiple head networks with varying complexity may be available for selection.

The ResNeXt 101 layer network described with reference to FIG. 4 provides one CNN architecture option which results in high task performance, but also high complexity and relatively high bitrate. One alternative is a low complexity CNN architecture such as the YOLOv3 architecture. The YOLOv3 architecture has lower task performance, but is low complexity and also results in relatively lower bitrate. The relative bitrate performance is discussed further below with reference to Table 3.

Figure 5:
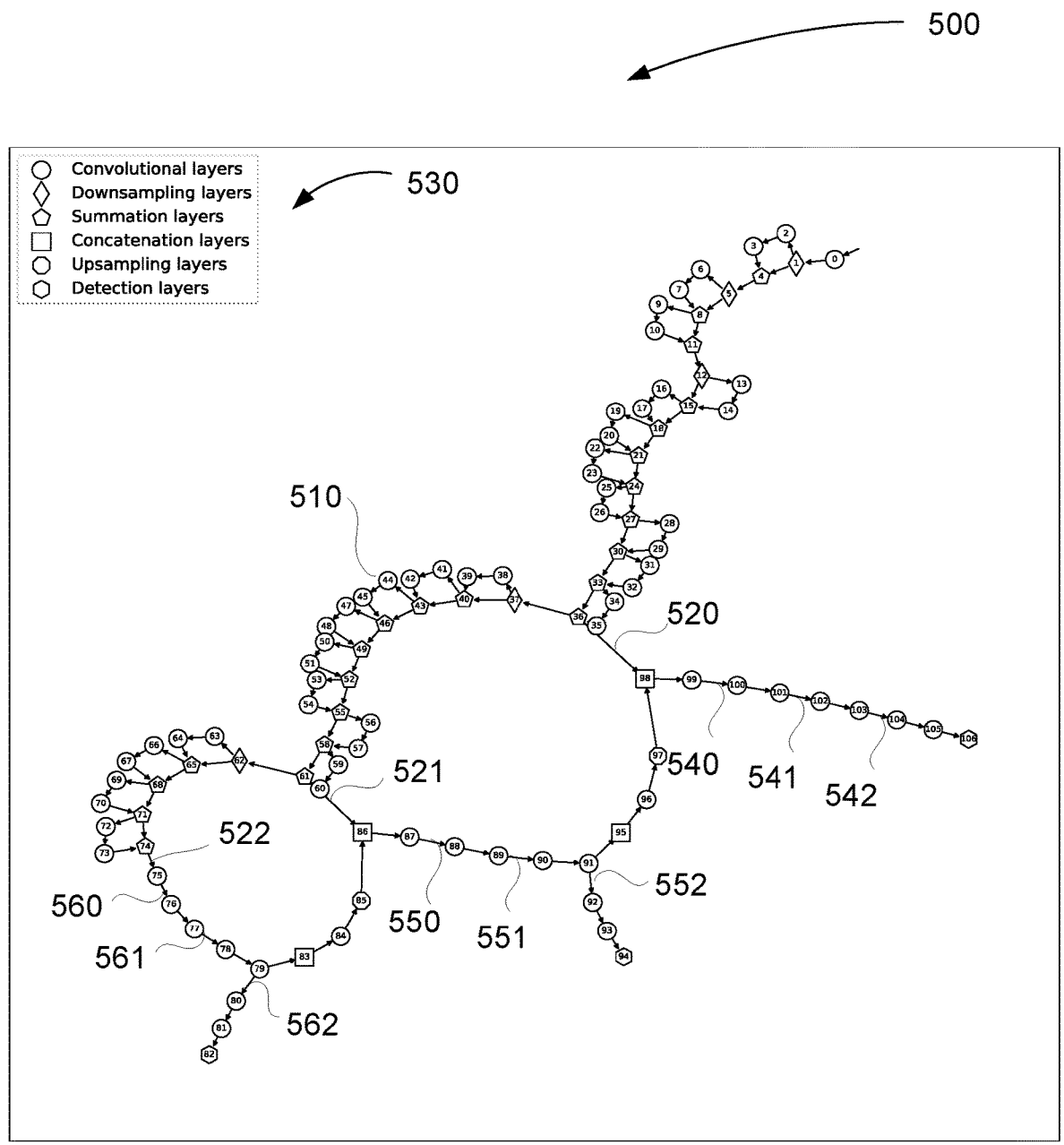
FIG. 5 is a schematic graph showing a YOLOv3 network.

FIG. 5 shows a graph representation of the YOLOv3 network 500. Each node, such as node 510 in the YOLOv3 network 500, represents a neural network layer. Each arrow, such as arrow 520 in the YOLOv3 network 500, represents a feature tensor passing from one neural network layer to another neural network layer. Different types of neural network layers are represented in the YOLOv3 network 500 by different node shapes. Different types of neural network layers identified in shape by a table 530 include convolutional layers, downsampling layers, summation layers, concatenation layers, upsampling layers, detection layers, and pooling layers (not shown in FIG. 5).

For each of the types of neural network layers represented by a node in the YOLOv3 network 500, operation of the neural network layer may include a batch normalisation step and a nonlinearity step. For example, a convolutional layer generally consists of a convolution step, followed by a batch normalisation step, and finally a nonlinearity step. The batch normalisation step may also be referred to as a batch normalisation layer, and the nonlinearity step may also be referred to as a nonlinearity layer.

Batch normalisation multiplies each element of an input tensor to the batch normalisation step by scaling factors $\gamma$ and then adds offsets $\beta$. $\gamma$ and $\beta$ are learned during network training, and are generally vectors with length equal to the number of input channels. In other words, $\gamma$ and $\beta$ apply the same values across the batch and spatial dimensions. Assuming that the input tensor does not statistically differ from tensors the batch normalisation step was trained on, the output of batch normalisation, as the name of the step suggests, is normalised to have a standard Gaussian distribution.

The nonlinearity step may follow batch normalisation and applies a nonlinear mapping to each element of an input tensor to the nonlinearity step. The nonlinear mapping may also be referred to as an 'activation' or 'activation function'. The nonlinear mapping may be a sigmoid function, a rectified linear unit (ReLU), a 'leaky' ReLU, a 'mish' function, or some other nonlinear mapping function. The use of nonlinearity steps within neural network layers distinguish neural networks from other machine learning techniques such as support vector machines.

Convolutional layers are typically the most common type of neural network layer used in CNNs. Let an input tensor T to an example convolutional layer have dimensions B×C×H×W, where B is the batch size, C is the number of input channels, H is the input spatial height and W is the input spatial width. The convolutional layer's operation is determined by a set of learned weights ω with dimension C×Y×X×O, where Y and X are the height and width respectively of the convolutional support S, and O is the number of output channels. For a convolutional layer with a stride of one, an output tensor U with dimensions B×O×H×W is calculated using equation (1) below:

$$U[b, o, y, x] = \sum_{i,j \in S, c \in C} T[b, c, y+j, x+i] * \omega[c, j, i, o] \quad (1)$$

In the equation above, samples indexed from T which are spatially outside the range of T may be estimated by a boundary extension policy. For example, the samples may be set to zero (zero boundary extension), or set equal to the spatially nearest sample in T (constant boundary extension), or set by some other policy. In convolutional layers where boundary extension is not used, the output tensor U will have smaller spatial dimensions with the decrease in spatial dimensions related to the support size of S.

Convolutional layers are distinguished by the layers' associated weights having spatial dimensions which correspond with the support size of the convolutional operation. In contrast, fully connected layers have weights with spatial dimensions determined by the spatial dimensions of the input tensor. Spatial dimensions of the convolutional support size are typically relatively small compared to the spatial dimensions of the input tensor. For example, the convolutional layers may have support sizes of 3×3, 5×5, or 7×7. Convolutional layers may be referred to by their support size, such as '1×1 convolution layers', '3×3 convolutional layers', and so on. By applying the spatial weights in a sliding window manner across the input tensor, convolutional layers have much less complexity than fully connected layers, and are also able to model behaviour which is regularised spatially.

In the YOLOv3 network 500, nodes representing convolutional layers are for convolutional layers with stride of one. The spatial dimensions of output tensors from each convolutional layer are equal to the spatial dimensions of the corresponding input tensors. Conversely, convolutional layers with stride greater than one are represented in the YOLOv3 network 500 with nodes labelled as downsampling layers. Convolutional layers with stride s have an operation which can be described by equation (2):

$$U[b, o, y, x] = \sum_{i,j \in S, c \in C} T[b, c, y+s*j, x+s*i] * \omega[c, j, i, o] \quad (2)$$

In the YOLOv3 network 500, downsampling layers have a stride of two, and therefore the spatial dimensions of output tensors from each downsampling layer are halved relative to the spatial dimensions of the corresponding input tensors. Downsampling layers are used to progressively reduce the spatial resolution of data passing through the neural network, and are one building block used to produce feature pyramids.

Summation layers are relatively simple operations in neural networks. A summation layer may take multiple input tensors, each with the same dimensions. The output tensor is calculated by an element-wise sum across each of the input tensors. Because a summation layer does not have any associated learned weights, the summation layer may also be referred to as a 'summation operation' or 'element-wise summation'.

Although a simple operation, summation layers take on an important role in the formation of 'residual blocks'. A residual block generally ends in a summation layer, which combines two tensors resulting from two parallel paths through the residual block. The first path through the residual block is a direct copy of the input tensor to the residual blocks, and is typically referred to as a 'shortcut connection'. The second path through the residual block passes through a sequence of convolutional layers. The sequence of convolutional layers is designed to minimise the complexity of the residual block, while not overly limiting the representability of the residual block. In a worst case, the shortcut connection copies the input tensor of the residual block across to the output of the residual block, while the second path through the residual block outputs a zero tensor. Then in the worst case the residual block implements an identity function. Therefore, during network training, the second path through the residual block only learns a variation from the identity function implemented by the shortcut connection. The variation learned by the second path may be referred to as the 'residual function'.

Similarly to summation layers, concatenation layers are relatively simple operations which do not have any associated learned weights. A concatenation layer may also be referred to as a 'concatenation operation' or 'channel-wise concatenation'. A concatenation layer may take multiple input tensors, each with the same batch size and spatial dimensions. The output tensor is calculated by concatenation of the input tensors across the channel dimension. In other words, the channel size of the output tensor is equal to the sum of the channel sizes of the input tensors. Channel-wise concatenation is a common step performed to non-destructively combine information from multiple sources.

Upsampling layers typically do not have any associated learned weights. An upsampling layer may be referred to as an 'upsampling operation' or 'interpolation'. An upsampling layer takes an input tensor with dimensions B×C×H×W and generates an output tensor with dimensions B×C×H$_o$×W$_o$ where the output spatial dimensions H$_o$ and W$_o$ are larger than the input spatial dimensions. The method by which additional samples are predicted from the input tensor may be any one of numerous interpolation methods, such as bilinear interpolation, spline interpolation, band-limited interpolation, or learned interpolation. In the case of learned interpolation, the upsampling layer does consist of associated learned weights. In the YOLOv3 network 500, the spatial dimensions of output tensors from upsampling layers are doubled relative to the spatial dimensions of the corresponding input tensors. The upsampling layers are used to prepare tensors with different spatial resolution so that the information contained within the tensors can be combination by concatenation layers.

In the YOLOv3 network 500, detection layers are 1×1 convolutional layers trained to produce object detection proposals. From the output tensor produced by a detection layer, each spatial location may be referred to as a detection cell. The number of output channels is designed based on the number of object detection proposals P each cell should generate, and the number of different object classes k the detection layer is trained to recognise. For each object detection proposal, the detection layer generates bounding box coordinate predictions, an 'objectness' score, and confidence scores for each of the k object classes. The number of output channels is P*(k+5).

The detection layer of the YOLOv3 network 500 is one example of an output layer of a CNN, and does not limit the applicability of the feature coding system 100 to other neural networks and other computer vision tasks. For other computer vision tasks, the output layer may be a convolutional layer with different structure, or may be a fully connected layer, or another type of neural network layer. The only requirement for an output layer is to produce raw results that can be interpreted or processed to produce the desired computer vision task result.

Not shown in the YOLOv3 network 500 but used in many neural networks, pooling layers provide another means of reducing the spatial resolution of data passing through a neural network. From an input tensor to a pooling layer, groups of samples ('pools'), are selected spatially spaced apart by a stride s. The size of the pools may be s×s, in which case the pools are non-overlapping. The size of the pools may also be greater than s×s, in which case the pools are overlapping. The output tensor of the pooling layer is generated by calculating a representative value from each pool. For example, the representative value may be the mean of the pool samples, in which case the layer may be referred to as an average pooling layer. Alternatively, the representative value may be the maximum of the pool samples, in which case the layer may be referred as a 'max pool' layer. One special case of the pooling layer is when s is set to the spatial size of the input tensor, in which case a single representative value is chosen for each input channel. The special case is referred to as a 'global pooling' layer.

In one arrangement of the feature coding system 100, the YOLOv3 network 500 is split into a backbone network and a head network according to the policy of FIG. 3. That is, nodes 0 through to 74 inclusive in the YOLOv3 network 500 are identified as wholly contained within the canonical image classification network for the YOLOv3 network 500, and therefore are defined to constitute the backbone network. The remaining nodes 75 through to 106 inclusive in the YOLOv3 network 500 are defined to constitute the head network. The split points between the backbone network and the head network (520-522 respectively) are the edges between pairs of nodes (36, 98), (61,86), and (74,75). The split points of the present arrangement may be signalled in the bitstream 121 by setting the syntax element network_split_points to a default value of zero. In the implementation described, the YOLOv3 network 500 performs object detection. However, in a general YOLOv3 architecture the head network may be replaced with another head network trained to perform the desired computer vision task.

As described above, the choice of CNN architecture affects the size of the backbone features 117, and therefore the bitrate of the bitstream 121. For example, the compressibility of backbone features extracted from default split points of the ResNeXt 101 layer architecture shown in FIG. 4, and the compressibility of backbone features extracted from default split points of the YOLOv3 architecture shown in FIG. 5 may be assessed by examining the size of the respective backbone features. Let the spatial size of the video frame data 113 be H×W. The total number of video samples per frame may be 3×H×W for video with 444 chroma format, 2×H×W for video with 422 chroma format, 1.5×H×W for video with 420 chroma format, or H×W for monochrome video. Let the spatial size of the preprocessed frame data 115 be H*×W*, where H*≈rH and W*≈rW for some resizing ratio r which is intended to optimise computer vision task performance of the CNN. A typical resizing ratio is 0.5.

Table 3 below shows the spatial size and number of channels for each of the backbone tensors resulting from the default split points of the ResNeXt 101 layer architecture and the YOLOv3 architecture. In Table 3, and similar analyses of backbone tensor sizes below, batch size of the backbone tensors is assumed to be one. Batch sizes greater than one are typically of use during training of CNNs but do not provide benefit during inference. During inference, a batch size of B means that B consecutive video frames from the video frame data 113 are processed as one unit rather than sequentially by the feature coding system 100. Therefore, the analysis in Table 3 with B=1 examines the size of backbone tensors yielded per video frame.

As shown in Table 3, there are five backbone feature tensors corresponding to the default split points of the ResNeXt 101 layer architecture. Each feature tensor has 256 channels and collectively the backbone feature tensors span a dyadic pyramid of spatial resolutions. The total number of backbone tensor samples corresponding to the default split points of the ResNeXt 101 layer architecture is H*×W*×21.3125. For a resizing ratio of 0.5, the total number of backbone tensor samples in terms of the video frame data 113 spatial dimensions is H×W×5.328125. Therefore, for a typical resizing ratio of 0.5, the total number of backbone tensor samples corresponding to the default split points of the ResNeXt 101 layer architecture is greater than the total number of video samples per frame for any of the common chroma formats described above. One disadvantage of an implementation of the feature coding system 100 which uses the ResNeXt 101 layer architecture is that the bitrate of the bitstream 121 is relatively high.

TABLE 3

Backbone tensor dimensions

| Backbone tensor spatial dimensions | Backbone tensor channel dimensions | |
|---|---|---|
| | ResNeXt 101 layer | YOLOv3 |
| H* × W* | | |
| H*/2 × W*/2 | | |
| H*/4 × W*/4 | 256 | |
| H*/8 × W*/8 | 256 | 256 |
| H*/16 × W*/16 | 256 | 512 |
| H*/32 × W*/32 | 256 | 1024 |
| H*/64 × W*/64 | 256 | |
| Total sample count | H* × W* × 21.3125 | H* × W* × 7 |

In contrast, the total number of backbone tensor samples corresponding to the default split points of the YOLOv3 architecture is H*×W*×7. For a resizing ratio of 0.5, the total number of backbone tensor samples in terms of the video frame data 113 spatial dimensions is H×W×1.75. Therefore, for a typical resizing ratio of 0.5, the total number of backbone tensor samples corresponding to the default split points of the YOLOv3 architecture is comparable with the total number of video samples per frame for the common chroma formats described above. One advantage of the present arrangements of the feature coding system 100 which uses the YOLOv3 architecture is thus that the bitrate of the bitstream 121 is relatively lower than for the ResNeXt 101 layer architecture, and may be comparable with compressed bitstreams produced by compressing the video frame data 113 with conventional video coding technology. However, one disadvantage of the present arrangement using the YOLOv3 architecture is lower computer vision task performance than may be achieved with the ResNeXt 101 layer architecture.

The ResNeXt 101 layer architecture provides high task performance, but also relatively high bitrate. The YOLOv3 architecture provides relatively lower bitrate, but has lower task performance. Another alternative is a CNN architecture based on YOLOv4, which provides improved task performance compared to YOLOv3, while maintaining low bitrate. The task performance of YOLOv4 is typically superior to YOLOv3, but still lower than the task performance of the ResNeXt 101 layer architecture.

Figure 6:
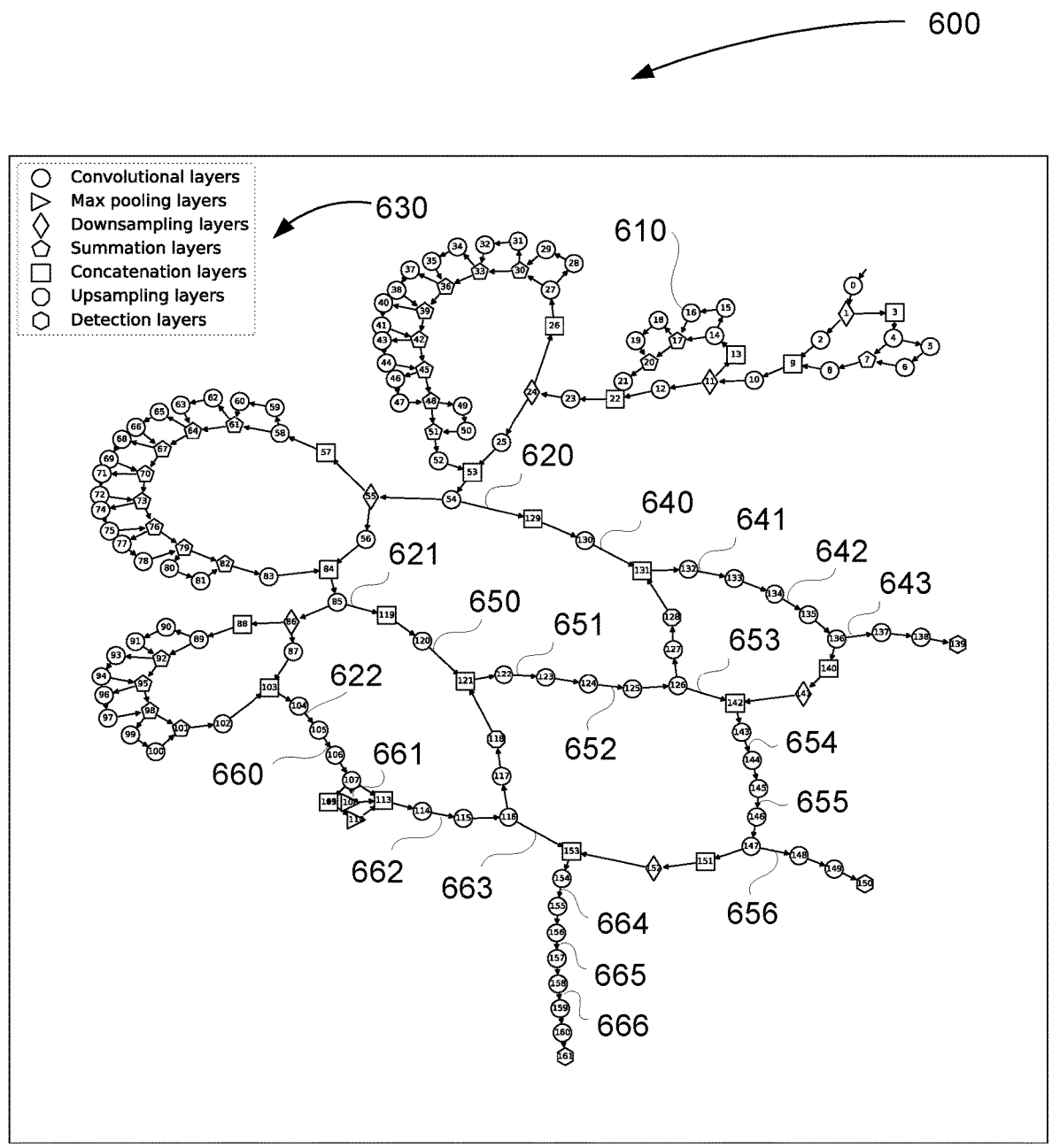
FIG. 6 is a schematic graph showing a YOLOv4 network.

FIG. 6 shows a graph representation of the YOLOv4 network 600. Each node in the YOLOv4 network 600, such as node 610, represents a neural network layer. Each arrow in the YOLOv4 network 600, such as arrow 620, represents a feature tensor passing from one neural network layer to another neural network layer. Different types of neural network layers are represented in the YOLOv4 network 600 by different node shapes. The different types of neural network layers are identified by different shapes as indicated in a table 630. The different types of neural network layers include convolutional layers, downsampling layers, summation layers, concatenation layers, upsampling layers, detection layers, and pooling layers, and have been described above in relation to FIG. 5.

In one arrangement of the feature coding system 100, the YOLOv4 network 600 is split into a backbone network and a head network according to the policy of FIG. 3. That is, nodes 0 through to 104 inclusive in the YOLOv4 network 600 are identified as wholly contained within the canonical image classification network for the YOLOv4 network 600, and therefore are defined to constitute the backbone network. The remaining nodes 105 through to 161 inclusive in the YOLOv4 network 600 are defined to constitute the head network. The split points between the backbone network and the head network are the edges between pairs of nodes (54, 129), (85, 119), and (104, 105) (shown as 620-622 respectively). The split points of the present arrangement may be signalled in the bitstream 121 by setting the syntax element network_split_points to a default value of zero. In the present arrangement the YOLOv4 network 600 performs object detection. However, in a general YOLOv4 architecture the head network may be replaced with another head network trained to perform the desired computer vision task.

Relative to the YOLOv3 network 500, the YOLOv4 network 600 typically has superior task performance with the trade-off of higher complexity. However, the number of split points is the same with three spatial resolutions of backbone features. Moreover, the backbone features resulting from the default split points of the YOLOv4 architecture are identical in dimensionality with the backbone features resulting from the default split points of the YOLOv3 architecture, with the same spatial resolutions and number of channels. The total number of backbone tensor samples corresponding to the default split points of the YOLOv4 architecture is also H*×W*×7. Therefore, one advantage of the present arrangement is that the YOLOv4 architecture offers improved task performance relative to the YOLOv3 architecture, while maintaining the relatively low bitrate of the YOLOv3 architecture.

Arrangements described above with reference to FIGS. 5 and 6 demonstrate that for lower complexity CNN architectures such as the YOLOv3 architecture and the YOLOv4 architecture, default split points can be defined according to the policy of FIG. 3 such that resulting backbone features are comparable in total number of samples with the video frame data 113. However, the inventors have determined that neural network feature tensors with significantly lower number of samples may be located at alternative split points in CNN architectures.

For example, in the YOLOv3 network 500 the default split points 520-522 are shown by edges between pairs of nodes (36, 98), (61, 86), and (74, 75). The default split point with the highest spatial resolution 520 is shown by the edge (36, 98) and as indicated in Table 3, the backbone feature tensor extracted from the default split point (36, 98) has 256 channels. However, alternative split points for the highest spatial resolution (540-542 respectively) may be defined at edges between pairs of nodes (99, 100), (101, 102), or (103, 104). For each of the alternative split points for the highest spatial resolution, the backbone feature tensor extracted has only 128 channels. The backbone feature tensor extracted from the default split point with the medium spatial resolution 521 shown by the edge (61, 86) has 512 channels. Alternative split points for the medium spatial resolution (550-552 respectively) may be defined at edges between pairs of nodes (87, 88), (89, 90), or (91, 92). For each of the alternative split points for the medium spatial resolution, the backbone feature tensor extracted has only 256 channels. The backbone feature tensor extracted from the default split point with the lowest spatial resolution 522 shown by the edge (74, 75) has 1024 channels. Alternative split points for the lowest spatial resolution (560-562 respectively) may be defined at edges between pairs of nodes (75, 76), (77, 78), or (79, 80). For each of the alternative split points for the lowest spatial resolution, the backbone feature tensor extracted has only 512 channels.

In one arrangement of the feature coding system 100, alternative split points of the YOLOv3 architecture are defined by choosing one of the alternative split points described above for each of the highest, medium, and lowest spatial resolutions. The chosen alternative split points are signalled by the syntax element network_split_points, with signalling mechanisms described further below with reference to Table 5. The total number of backbone tensor samples corresponding to the alternative split points chosen is H*×W*×3.5. For a resizing ratio of 0.5, the total number of backbone tensor samples in terms of the video frame data 113 spatial dimensions is H×W×0.875. Therefore, for a typical resizing ratio of 0.5, the total number of backbone tensor samples corresponding to the alternative split points of the YOLOv3 architecture is lower than the total number of video samples per frame for the common chroma formats described above. One advantage of the present arrangement signalling alternative split points of the YOLOv3 architecture is that the bitrate of the feature coding system 100 may be significantly less than the bitrate of compressed bitstreams produced by compressing the video frame data 113 with conventional video coding technology.

Significantly lower bitrate may also be achieved by choosing alternative split points in the YOLOv4 architecture. In the YOLOv4 network 600, the default split points 620-622 are shown by edges between pairs of nodes (54, 129), (85, 119), and (104, 105). The backbone feature tensor extracted from the default split point with the highest spatial resolution 620 shown by the edge (54, 129) has 256 channels. However, alternative split points for the highest spatial resolution (640-643 respectively) may be defined at edges between pairs of nodes (130, 131), (132, 133), (134, 135), or (136, 137). For each of the alternative split points for the highest spatial resolution, the backbone feature tensor extracted has only 128 channels. The backbone feature tensor extracted from the default split point with the medium spatial resolution 621 shown by the edge (85, 119) has 512 channels. Alternative split points for the medium spatial resolution (650-656 respectively) may be defined at edges between pairs of nodes (120, 121), (122, 123), (124, 125), (126, 142), (143, 144), (145, 146), or (147, 148). For each of the alternative split points for the medium spatial resolution, the backbone feature tensor extracted has only 256 channels. The backbone feature tensor extracted from the default split point with the lowest spatial resolution 622 shown by the edge (104, 105) has 1024 channels. Alternative split points for the lowest spatial resolution (660-666 respectively) may be defined at edges between pairs of nodes (105, 106), (107, 108), (114, 115), (116, 153), (154, 155), (156, 157), or (158, 159). For each of the alternative split points for the lowest spatial resolution, the backbone feature tensor extracted has only 512 channels.

In one arrangement of the feature coding system 100, alternative split points of the YOLOv4 architecture are defined by choosing one of the alternative split points described above for each of the highest, medium, and lowest spatial resolutions. The chosen alternative split points are signalled by the syntax element network_split_points, with signalling mechanisms described further below with reference to Table 5. The total number of backbone tensor samples corresponding to the alternative split points chosen is H*×W*×3.5. For a resizing ratio of 0.5, the total number of backbone tensor samples in terms of the video frame data 113 spatial dimensions is H×W×0.875. Therefore, for a typical resizing ratio of 0.5, the total number of backbone tensor samples corresponding to the alternative split points of the YOLOv4 architecture is lower than the total number of video samples per frame for the common chroma formats described above. One advantage of the present arrangement signalling alternative split points of the YOLOv4 architecture is that the bitrate of the feature coding system 100 may be significantly less than the bitrate of compressed bitstreams produced by compressing the video frame data 113 with conventional video coding technology.

Table 4 below summarises the alternative split points for both the YOLOv3 architecture and the YOLOv4 architecture which result in H*×W*×3.5 total number of backbone tensor samples.

TABLE 4

| | Alternative split points | | |
|---|---|---|---|
| Backbone tensor spatial dimensions | YOLOv3 alternative split points | YOLOv4 alternative split points | Backbone tensor channel dimensions |
| H* × W* | | | |
| H*/2 × W*/2 | | | |
| H*/4 × W*/4 | | | |

TABLE 4-continued

| | Alternative split points | | |
|---|---|---|---|
| Backbone tensor spatial dimensions | YOLOv3 alternative split points | YOLOv4 alternative split points | Backbone tensor channel dimensions |
| H*/8 × W*/8 | (99, 100), (101, 102), (103, 104) | (130, 131), (132, 133), (134, 135), (136, 137) | 128 |
| H*/16 × W*/16 | (87, 88), (89, 90), (91, 92) | (120, 121), (122, 123), (124, 125), (126, 142), (143, 144), (145, 146), (147, 148) | 256 |
| H*/32 × W*/32 | (75, 76), (77, 78), (79, 80) | (105, 106), (107, 108), (114, 115), (116, 153), (154, 155), (156, 157), (158, 159) | 512 |
| H*/64 × W*/64 | | | |

In one arrangement of the feature coding system 100, alternative split points of the CNN architecture may be predetermined and signalled by setting the syntax element network_split_points to a fixed value. Table 2 provides one example by which a small number of predetermined split points may be signalled with fixed values of network_split_points.

In another arrangement of the feature coding system 100, alternative split points are not predetermined but instead explicitly signalled in the network_split_points syntax element. An example signalling mechanism for the alternative split points is shown in Table 5 below for the YOLOv3 architecture, which is signalled by setting cnn_architecture to the value four, and for the YOLOv4 architecture, which is signalled by setting cnn_architecture to the value five. In the example of Table 5, the network_split_points syntax element is a variable length code. Bit position 0 of the network_split_points is interpreted as a 'default split points flag'. When the default split points flag is zero, the signalled split points are predetermined default split points defined by the policy of FIG. 3, and the network_split_points syntax element is one bit long. When the default split points flag is one, the signalled split points are instead determined from three additional fixed length codes parsed from the network_split_points syntax element. The three additional fixed length codes are interpreted as offsets of the signalled split points from the predetermined default split points for the highest, medium, and lowest spatial resolutions respectively. The example of Table 5 shows that the offsets are interpreted from the fixed length codes as signed integers, indicating that the alternative split points may be located earlier in the default backbone network if a negative offset is signalled, or located later in the default head network if a positive offset is signalled. In another arrangement, the offsets may instead be interpreted as unsigned integers, in which case the alternative split points are predetermined by the signalled CNN architecture to either be wholly contained within the default backbone network, or wholly contained within the default head network.

TABLE 5

Example signalling of alternative split points

| cnn_architecture | Default split points flag | network_split_points | | |
|---|---|---|---|---|
| | | Highest resolution split point offset | Medium resolution split point offset | Lowest resolution split point offset |
| 4 or 5 | 0 | N/A | N/A | N/A |
| 4 | 1 | Int(4) | Int(4) | Int(4) |
| 5 | 1 | Int(4) | Int(6) | Int(8) |

In one arrangement, the alternative split points may be determined from the offsets by enumeration of the neural network layers, such as the node labels shown in FIGS. 5 and 6. For example, to signal a medium resolution alternative split point (143, 144) for the YOLOv4 architecture, a medium resolution split point offset of +25 may be signalled to indicate the difference between the starting layer 144 of the alternative head network and the starting layer 119 of the default head network. In another arrangement, the alternative split points may be determined from the offsets instead by the number of layers earlier or later along the path of execution in the CNN architecture. For example, to signal the medium resolution alternative split point (143, 144) for the YOLOv4 architecture, a medium resolution split point offset of +10 may be signalled to indicate the alternative split point is located 10 layers further along the path of execution after the default split point (85, 119). In both arrangements, interpretation of the signalled offsets are based upon a definition of which operations in the CNN architecture are considered to be one 'layer'. Different definitions of 'layers', such as if batch normalisation is considered a layer, will result in correspondingly different offset values.

Alternate methods for signalling the splits to be used in the bitstream may also be used, for example by encoding actual node numbers, encoding a selection from a subset of split points, encoding an offset from an outer layer, encoding reference to a look-up table of split point associated with a CNN and the like.

The head CNN network can comprise different types of nodes or layers or be subject to some constraints based on different types of layers. For example, in some implementations the starting layer of the CNN head can be limited to a layer which is not a summation layer. In other implementations the starting layer of the CNN head is a layer which is immediately after a convolutional layer. The starting layer of the CNN head can be effectively limited to a layer which is included in a set of layers from the predetermined default layer, for example a predetermined distance or offset of layers from the default layer. In yet other arrangements the default split may occur at an output. If signalling offsets from default or output layers, the offset may be limited to certain sets of layers, for example layers that are not summation layers and/or within a given distance or offset from an output layer.

FIG. 7 shows a method 700 for encoding neural network features and associated metadata to the bitstream 121. The method 700 can be implemented on the source device 110 for example, by execution of software 233 stored in the memory 206 and under control of the processor 205. The method 700 begins at an encode CNN architecture step 710. At the encode CNN architecture step 710, the method 700 determines the CNN architecture of the feature coding system 100. The CNN architecture may be predetermined if the source device 110 only supports one CNN architecture, or the CNN architecture may be selected from a plurality of architectures supported by the source device 110 according to desired trade-offs between complexity, bitrate, and task performance. The determined CNN architecture is signalled by encoding the cnn_architecture syntax element to the bitstream 121. The method 700 proceeds under control of the processor 205 from step 710 to an encode split points step 720.

At the encode split points step 720, the method 700 determines a backbone network for the determined CNN architecture, and correspondingly the location of split points separating the determined backbone network from the head network for the determined CNN architecture. The step 720 effectively identifies a division of the selected CNN into first and second parts, each of the first and second parts being different, and encodes information used for determining at least the starting layer of the second (head) part of the neural network into the bitstream. The split points may be predetermined if the source device 110 only supports one backbone network for the determined CNN architecture, or the split points may be determined by selecting from backbone networks supported by the source device 110 according to desired trade-offs between complexity, bitrate, and computer vision tasks supported by the backbone network. The determined split points are signalled by encoding the network_split_points syntax element to the bitstream 121. The method 700 proceeds under control of the processor 205 from step 720 to a backbone inference step 730.

Steps 710 and 720 effectively encode information for determining at least a starting layer of the head neural network to the bitstream. The starting layer of the second part is determined from information which associates the starting layer with the neural network. The encoded CNN architecture alone can identify a default split point or starting layer for the head network for example. Additionally or alternatively, the encoded split points in their own right can provide information for determining at least the starting layer of the head neural network, for example by indicating an offset or distance difference between a predetermined layer and the starting layer of the head network.

At the backbone inference step 730, the method 700 processes the next video frame from the video frame data 113. The next video frame may be preprocessed by the frame processing module 114 having implemented image processing steps such as image registration, white colour balancing, or image resizing, resulting in a preprocessed frame. The preprocessed frame is inferenced by the determined backbone network, producing backbone features 117. The backbone inferencing may be implemented by the CNN backbone module 116. The method 700 proceeds under control of the processor 205 from step 730 to an encode features step 740.

The encode features step 740 can be implemented by the feature encoder 120. At the encode features step 740, the method 700 encodes the backbone features 117 to the bitstream 121, or a separate feature bitstream. Step 740 operates to encode data processed using the first (backbone) part of the neural network into the bitstream. The method 700 proceeds under control of the processor 205 from step 740 to an end of sequence test 750.

Steps 710 to 740 encode information for data processed using a first part of a neural network, being the feature channels generated by the backbone network. In the example described, the information is encoded to a bitstream.

At the end of sequence test 750, the method 700 checks whether there are any remaining frames from the video frame data 113. If there are any remaining frames ("N" at step 750), the method 700 proceeds to the backbone inference step 730. Otherwise ("Y" at step 750), the method 700 terminates.

FIG. 8 shows a method 800 for decoding neural network features from the bitstream 143 and performing desired computer vision tasks. The method 800 can be implemented on the destination device 140 for example, by execution of software 233 stored in the memory 206 and under control of the processor 205. The method 800 begins at a decode CNN architecture step 810. The step 810 can be implemented by the feature decoder 150 on receiving the bitstream based on data output by at least a first part of a neural network at the CNN backbone module 116. At the decode CNN architecture step 810, the method 800 determines a CNN architecture by decoding the cnn_architecture syntax element from the bitstream 143. The syntax element indicates the type of CNN architecture selected and encoded at step 710. The method 800 proceeds under control of the processor from step 810 to a decode split points step 820.

At the decode split points step 820, the method 800 determines the location of split points in the determined CNN architecture by decoding the network_split_points syntax element from the bitstream 143. From the determined CNN architecture and the determined split points, the method 800 determines the number, shape, and size of corresponding backbone tensors. The method 800 proceeds under control of the processor 205 to a decode features step 830.

Steps 810 and 820 effectively decode information for determining at least a starting layer of the head neural network. The starting layer of the second part is determined from information which associates the starting layer with the neural network. The decoded CNN architecture alone can identify a default split point or starting layer for the head network for example. Additionally or alternatively, the decoded split points in their own right can provide information for determining at least the starting layer of the head neural network, for example by indicating an offset or distance difference between a predetermined layer and the starting layer of the head network.

The information decoded at step 820 may relate to a single split point or starting layer for the head network or multiple split points and corresponding starting layers for the head network.

At the decode features step 830, the method 800 decodes backbone features 151 for the next video frame from the bitstream 143, or a separate feature bitstream. The decoded backbone tensors may be referred to as feature map data representing the captured image data 113. The feature decoding may be guided by the determined number, shape, and size of the backbone tensors. The method 800 proceeds under control of the processor 205 from step 830 to a head inference step 840.

The head inference step 840 is implemented at the CNN head 154. At the head inference step 840, the method 800 determines a head network compatible with the determined CNN architecture, the determined split points, and a desired computer vision task. The computer vision task may be predetermined for the destination device 140, or selected by an algorithm or a human user. The head network may be selected from head networks satisfying the compatibility constraints, and supported by the destination device 140, according to trade-offs between complexity and computer vision task performance. The backbone features 151 are inferenced by the determined head network, producing a task result for the current video frame. The head network is used at step 840 to perform at least one computer vision task to decode the bitstream, thereby providing a computer vision result such as identifying or tracking an object or tracking a pose. The method 800 proceeds from step 840 to an end of sequence test 850.

Steps 810 to 830 decodes information for data generated by a first part of a neural network, the feature channels generated by the backbone network. In the example described, the information is decoded from a bitstream.

At the end of sequence test 850, the method 800 checks whether there are any remaining frames to be decoded from the bitstream 143. If there are any remaining frames ("N" at step 850), the method 800 returns to the decode features step 830 for the next frame. Otherwise ("Y" at step 850), the method 800 terminates.

In the example above the steps 810 to 840 are implemented on the destination device 140. In other arrangements the steps 810 to 840 may be implemented across more than one device. For example, the steps 810 and 820 may be implemented on the destination device 140 to decode the CNN architecture and the split points for the CNN. The decoded CNN architecture and splits points may be transmitted to an external processor-based device, for example a cloud server. The steps 830 and 840 can be implemented on the external device.

Different examples are described above for YOLOv3 and YOLOv4 neural networks. The arrangements described may also be used for different types of CNN. The type of CNN can be encoded into the bitstream as described in relation to step 710 and decoded from the bitstream as described in relation to step 810. Correspondingly, split points indicating backbone and head division of the CNN can be encoded into the bitstream as described in relation to step 720. The split points can be decoded as described in relation to step 820. Selection of different CNNs and split points can vary based on features such as accuracy and throughput required, type of computer vision tasks required, structure of the neural networks in terms of layers and channels per node and the like.

INDUSTRIAL APPLICABILITY

The arrangements described are applicable to the computer and data processing industries and particularly for the digital signal processing for the encoding a decoding of signals such as data related to video and image signals, achieving high compression efficiency.

Ability to choose and encode different split points of a CNN into a bitstream allows flexibility of compression efficiency as a suitable split point can be identified for trade-offs between desired complexity, bitrate, and task performance. Further, if backbone neural networks are embedded in edge devices, efficiencies in encoding can also be realised. Complexity at a decoder side can be reduced and flexibility increased as different machine vision tasks can be implemented by different head CNNs. Reducing the tensor dimensions output by the backbone CNN through selection of split points can also increase efficiency at the decoder side. The arrangements described also allow different CNNs (for example YOLOv3 or YOLOv4) to be selected and the selection encoded in the bitstream, again allow increased options and flexibility. For example selection of lower complexity CNN architectures such as YOLOv3 and YOLOv4 and selection of appropriate split points can make feature coding competitive with traditional coding solutions.

The arrangements described are particularly useful for encoding and decoding tensors representing features for data related to video and image signals. The arrangements described may also be used for encoding and decoding other information that can be generated by a convolutional neural network comprising backbone and head networks.

The foregoing describes only some embodiments of the present invention, and modifications and/or changes can be made thereto without departing from the scope and spirit of the invention, the embodiments being illustrative and not restrictive.

The invention claimed is:

1. A method of decoding information for data generated by a first part of a neural network, the method comprising:
   decoding information for determining at least a starting layer of a second part of the neural network, the neural network including at least the first part and the second part, the second part being different from the first part; and
   determining the starting layer of the second part of the neural network based on the decoded information;
   wherein the neural network includes a layer of a first type which is a summation layer that generates one or more new tensors based on a plurality of tensors, and
   wherein the starting layer of the second part of the neural network is limited to a layer which is not the first type.

2. The method according to claim 1, wherein the method further comprises:
   decoding the data generated by the first part from a bitstream; and
   processing the decoded data using the second part of the neural network in accordance with the determined starting layer.

3. The method according to claim 1, wherein the method further comprises:
   transmitting the decoded information indicating the starting layer to an external processing device,
   decoding the data generated by the first part of the neural network from a bitstream at the external processing device; and
   processing the decoded data using the second part of the neural network in accordance with the determined starting layer.

4. The method according to claim 1,
   wherein the neural network includes a layer of a second type which is a convolutional layer, and
   wherein the starting layer of the second part of the neural network is limited to a layer which is immediately after a layer of the second type.

5. The method according to claim 1,
   wherein the neural network includes a layer of a third type which is an output layer, and
   wherein the starting layer of the second part of the neural network is limited to a layer which is included in a set of layers from a predetermined layer to a layer of the third layer in order of processing of the neural network, and
   wherein the set of layers does not include a layer of the first type.

6. The method according to claim 1, wherein the information indicates a difference between a predetermined layer and the starting layer.

7. The method according to claim 6,
   wherein the neural network includes a layer of a second type which is a convolutional layer, and
   wherein the predetermined layer is a layer which is immediately after a layer of the second type in the order of processing.

8. The method according to claim 6,
   wherein the neural network includes a layer of a third type which is an output layer, and
   wherein the predetermined layer is a layer of the third layer.

9. The method according to claim 6,
   wherein the predetermined layer is determined based on information indicating the neural network to be used.

10. The method according to claim 1,
    wherein the information identifies the neural network to be used, and
    wherein the starting layer of the second part of the neural network is determined from information which associates the starting layer with the neural network.

11. The method according to claim 1,
    wherein the information identifies (i) the neural network from a plurality of neural networks and (ii) a split point for the first and second parts of the neural network, and
    wherein the starting layer of the second part of the neural network is determined from the split point.

12. The method according to claim 1,
    wherein a plurality of starting layers of the second part of the neural network are determined in accordance with the information, and
    wherein the data is processed using the second part of the neural network in accordance with the determination of the plurality of starting layers.

13. A method of encoding information for data processed using a first part of a neural network, the method comprising:
    determining a starting layer of a second part of the neural network, the neural network including at least the first part and the second part, the second part being different from the first part; and
    encoding information used for determining at least the starting layer of the second part of the neural network;
    wherein the neural network includes a layer of a first type which is a summation layer that generates one or more new tensors based on a plurality of tensors, and
    wherein the starting layer of the second part of the neural network is limited to a layer which is not the first type.

14. The method according to claim 13, wherein the method further comprises:
    generating the data in accordance with the determination of the starting layer; and
    encoding the data processed using the first part.

15. The method according to claim 14, wherein the encoded information indicates a difference between a predetermined layer and the starting layer.

16. The method according to claim 15,
    wherein the neural network includes a layer of a second type which is a convolutional layer, and
    wherein the predetermined layer is a layer which is immediately after a layer of the second type in the order of processing.

17. The method according to claim 15,
    wherein the neural network includes a layer of a third type which is an output layer, and
    wherein the predetermined layer is a layer of the third layer.

18. The method according to claim 15, wherein the predetermined layer is determined based on information indicating the neural network to be used.

19. The method according to claim 13,
    wherein the neural network includes a layer of a second type which is a convolutional layer, and wherein the starting layer of the second part is limited to a layer which is immediately after a layer of the second type.

20. The method according to claim 13,
wherein the neural network includes a layer of a third type which is an output layer, and
wherein the starting layer of the second part is limited to a layer which is included in a set of layers from a predetermined layer to a layer of the third layer in order of processing of the neural network, and
wherein the set of layers does not include a layer of the first type.

21. The method according to claim 13,
wherein the encoded information identifies the neural network to be used, and
wherein the starting layer of the second part of the neural network is determined from information which associates the starting layer with the neural network.

22. The method according to claim 13, wherein the processing using the first part of the neural network is ended at a layer which is immediately before the starting layers.

23. The method according to claim 13,
wherein a plurality of starting layers of the second part are determined, and
wherein the data is processed using the second part of the neural network in accordance with the determination of the plurality of starting layers.

24. The method according to claim 13,
wherein the second part is to be used for processing data decoded from the bitstream.

25. The method according to claim 13,
wherein the encoded information identifies (i) the neural network from a plurality of neural networks and (ii) a split point for the first and second parts of the neural network.

26. A decoder for decoding information for data generated by a first part of a neural network, the decoder comprising:
a decoding unit configured to decode information for determining at least a starting layer of a second part of the neural network, the neural network including at least the first part and the second part, the second part being different from the first part; and
a determining unit configured to determine the starting layer of the second part of the neural network based on the decoded information;
wherein the neural network includes a layer of a first type which is a summation layer that generates one or more new tensors based on a plurality of tensors, and
wherein the starting layer of the second part of the neural network is limited to a layer which is not the first type.

27. An encoder for encoding information for data processed using a first part of a neural network, the encoder comprising:
a determining unit configured to determine a starting layer of a second part of the neural network, the neural network including at least the first part and the second part, the first part being different from the second part; and
an encoding unit configured to encode information used for determining at least the starting layer of the second part of the neural network;
wherein the neural network includes a layer of a first type which is a summation layer that generates one or more new tensors based on a plurality of tensors, and
wherein the starting layer of the second part of the neural network is limited to a layer which is not the first type.

28. A non-transitory computer-readable storage medium which stores a program for executing a method of decoding information for data generated by a first part of a neural network, the method comprising:
decoding information for determining at least a starting layer of a second part of the neural network, the neural network including at least the first part and the second part, the second part being different from the first part; and
determining the starting layer of the second part of the neural network based on the decoded information;
wherein the neural network includes a layer of a first type which is a summation layer that generates one or more new tensors based on a plurality of tensors, and
wherein the starting layer of the second part of the neural network is limited to a layer which is not the first type.

29. A non-transitory computer-readable storage medium which stores a program for executing a method of encoding information for data processed using a first part of a neural network, the method comprising:
determining a starting layer of a second part of the neural network, the neural network including at least the first part and the second part, the first part being different from the second part; and
encoding information used for determining at least the starting layer of the second part of the neural network;
wherein the neural network includes a layer of a first type which is a summation layer that generates one or more new tensors based on a plurality of tensors, and
wherein the starting layer of the second part of the neural network is limited to a layer which is not the first type.

* * * * *